US012715233B2

(12) United States Patent
Nakahara et al.

(10) Patent No.: US 12,715,233 B2

(45) Date of Patent: Aug. 25, 2026

(54) BOOKLET MAKING APPARATUS AND IMAGE FORMING APPARATUS

(71) Applicant: CANON KABUSHIKI KAISHA, Tokyo (JP)

(72) Inventors: Yasuhiro Nakahara, Kanagawa (JP); Koji Kawamura, Kanagawa (JP); Atsushi Kawarago, Shizuoka (JP); Kazushi Nishikata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 18/609,566

(22) Filed: Mar. 19, 2024

(65) Prior Publication Data

US 2024/0316978 A1 Sep. 26, 2024

(30) Foreign Application Priority Data

Mar. 20, 2023 (JP) ................................ 2023-044785

(51) Int. Cl.

*B65H 37/04* (2006.01)
*B42B 5/00* (2006.01)
*G03G 15/00* (2006.01)

(52) U.S. Cl.

CPC ............... *B42B 5/00* (2013.01); *B65H 37/04* (2013.01); *G03G 15/6544* (2013.01);

(Continued)

(58) Field of Classification Search

CPC .... B42B 5/00; B42C 1/12; B42C 9/00; B42C 9/0081; G03G 15/6544;

(Continued)

(56) References Cited

U.S. PATENT DOCUMENTS 7,740,237 B2 * 6/2010 Mano ........................ B42C 1/12 270/32
9,415,560 B2 * 8/2016 Morinaga ................ B31F 5/02

(Continued)

FOREIGN PATENT DOCUMENTS

JP 2000-255881 A 9/2000
JP 2014-151579 A 8/2014
WO 2019/048447 A1 3/2019

OTHER PUBLICATIONS

Search Report dated Sep. 19, 2024, in European Patent Application No. 24164435.0.

(Continued)

*Primary Examiner* — Leslie A Nicholson, III

(74) *Attorney, Agent, or Firm* — Venable LLP

(57) ABSTRACT

A booklet making apparatus includes a pressurizing member configured to oppose a first surface of a sheet bundle, a receiving member configured to oppose a second surface of the sheet bundle opposite to the first surface and nip the sheet bundle together with the pressurizing member, a moving portion configured to move the pressurizing member to a retracted position where the pressurizing member is retracted from the sheet bundle and a pressurizing position where the pressurizing member is in contact with the sheet bundle to pressurize the sheet bundle, a heating portion configured to heat the pressurizing member, and a sheet separation member configured to come into contact with the first surface of the sheet bundle and separate the sheet bundle from the pressurizing member in a process of the pressurizing member moving from the pressurizing position to the retracted position.

16 Claims, 13 Drawing Sheets

(52) U.S. Cl.
CPC .................... *G03G 15/6582* (2013.01); *B65H 2301/43823* (2013.01); *B65H 2301/5113* (2013.01); *B65H 2404/72* (2013.01); *G03G 2215/00848* (2013.01); *G03G 2215/00856* (2013.01); *G03G 2215/00936* (2013.01)

(58) Field of Classification Search
CPC .......... G03G 2215/00835; G03G 2215/00848; B65H 37/02; B65H 37/04; B65H 2553/40; B65H 2511/13; B65H 2301/43822; B65H 2301/43823; B65H 2301/51132; B65H 2801/27
USPC ....................................................... 270/58.08
See application file for complete search history.

(56) References Cited

U.S. PATENT DOCUMENTS

| | | | | |
|---|---|---|---|---|
| 9,440,478 | B2 * | 9/2016 | Takahashi | B31F 1/07 |
| 9,764,920 | B2 * | 9/2017 | Abe | B65H 37/04 |
| 10,093,512 | B2 * | 10/2018 | Abe | B42B 5/00 |
| 10,723,580 | B2 * | 7/2020 | Nobe | B42B 5/00 |
| 11,215,946 | B2 | 1/2022 | Koyama | |
| 11,279,586 | B2 | 3/2022 | Nakahara | |
| 11,662,683 | B2 | 5/2023 | Koyama | |
| 11,718,496 | B2 | 8/2023 | Nakahara | |
| 11,796,955 | B2 | 10/2023 | Monden | |
| 2014/0227064 | A1 * | 8/2014 | Matsue | B42C 13/003 412/37 |
| 2023/0348222 | A1 | 11/2023 | Kawamura | |
| 2024/0174016 | A1 | 5/2024 | Nakahara | |

OTHER PUBLICATIONS

Office Action dated Dec. 10, 2025, in Korean Patent Application No. 10-2024-0036928.

U.S. Appl. No. 18/606,031, filed Mar. 15, 2024 (First Named Inventor: Koji Kawamura).

* cited by examiner

BOOKLET MAKING APPARATUS AND IMAGE FORMING APPARATUS

BACKGROUND OF THE INVENTION

Field of the Invention

The present invention relates to a booklet making apparatus that makes a booklet by bonding sheets together, and an image forming apparatus that forms an image on a sheet.

Description of the Related Art

Japanese Patent Application Laid-Open No. 2000-255881 discloses a configuration in which a toner image for bonding is formed on a binding margin portion of each sheet by an image forming apparatus body, then sheets are stacked in a post-processing apparatus, and then the sheet bundle is heated and pressurized by a heater plate to bond the sheets together.

However, in the configuration of the document described above, there is a possibility that a sheet sticks to the heater plate in the case where, for example, the bonding is performed in a state in which the heater plate is directly in contact with the toner image for bonding formed on the upper surface of the uppermost sheet of the sheet bundle.

SUMMARY OF THE INVENTION

The present invention provides a booklet making apparatus and an image forming apparatus capable of suppressing occurrence of sticking of sheets.

According to an aspect of the invention, a booklet making apparatus includes a pressurizing member configured to oppose a first surface of a sheet bundle in which a plurality of sheets including at least one sheet on which an adhesive layer is formed are stacked, a receiving member configured to oppose a second surface of the sheet bundle opposite to the first surface and nip the sheet bundle together with the pressurizing member, a moving portion configured to move the pressurizing member to a retracted position where the pressurizing member is retracted from the sheet bundle and a pressurizing position where the pressurizing member is in contact with the sheet bundle to pressurize the sheet bundle, a heating portion configured to heat the pressurizing member, and a sheet separation member configured to come into contact with the first surface of the sheet bundle and separate the sheet bundle from the pressurizing member in a process of the pressurizing member moving from the pressurizing position to the retracted position.

Further features of the present invention will become apparent from the following description of exemplary embodiments with reference to the attached drawings.

DESCRIPTION OF THE EMBODIMENTS

Embodiments of the present disclosure will be described below with reference to drawings.

In the present disclosure, examples of an "image forming apparatus" widely include apparatuses that form an image on a recording material (recording medium), such as monofunctional printers having only a printing function, copiers having a copying function, multifunctional apparatuses having a plurality of functions, and commercial printers. In addition, the "image forming apparatus" may be a system (image forming system) in which an image forming apparatus body that forms an image on a recording material and devices such as a sheet processing apparatus and a sheet feeding apparatus are connected to each other.

First Embodiment

A configuration of an apparatus according to a first embodiment will be described. First, a configuration of the image forming apparatus body and the outline of a sheet processing apparatus that are common to each embodiment will be described, and then the details of a heat-and-pressure bonding portion in the first embodiment will be described.

Figure 1:
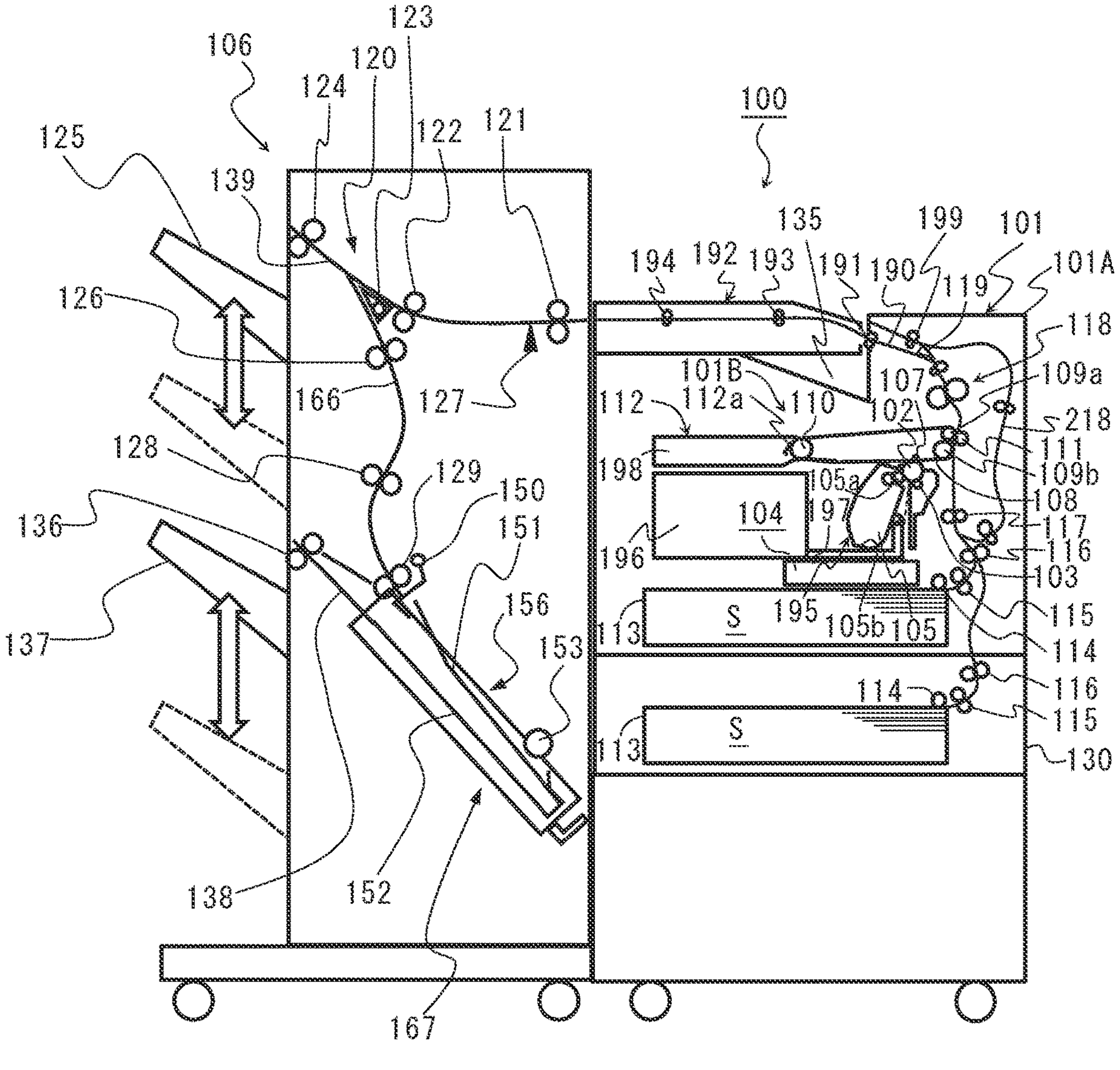
FIG. 1 is a schematic view of an image forming apparatus according to a first embodiment.

FIG. 1 is a schematic view of the image forming apparatus 100 according to the first embodiment. The image forming apparatus 100 includes a printer body 101 serving as an image forming apparatus body having an image forming function (printing function), and a sheet processing apparatus 106 having a sheet bonding function. That is, the image forming apparatus 100 can be referred to as an image forming system constituted by the printer body 101 that functions as an image forming apparatus by itself, and the sheet processing apparatus 106.

The image forming apparatus 100 of the present embodiment can create a booklet by performing printing and bookbinding in one apparatus by forming an image on sheets S one by one by the printer body 101 and performing heat-and-pressure bonding on a stack of a plurality of sheets S in the sheet processing apparatus 106. The printer body

101 can apply toner as an adhesive on each sheet S at the same time as image formation. That is, the printer body 101 can, while conveying the sheets S one by one, form an image on the sheet S and apply an adhesive on the sheet S. As the sheet S, a wide variety of sheet materials of different sizes and materials can be used. Examples of the sheet materials include paper sheets such as plain paper sheets and cardboards, surface-treated sheet materials such as coated paper sheets, plastic films, cloths, and sheet materials of irregular shapes such as envelopes and index paper sheets.

Image Forming Apparatus Body

The printer body 101 is an electrophotographic apparatus including a casing 101A, and an image forming portion 101B of an electrophotographic system accommodated in the casing 101A. The image forming portion 101B includes an intermediate transfer belt 108 serving as an intermediate transfer member, and a process cartridge 195 provided along the intermediate transfer belt 108. The image forming portion 101B is an electrophotographic unit of an intermediate transfer system. The process cartridge 195 includes a photosensitive drum 102 serving as an image bearing member, a charging unit 103 serving as a charging portion, and a developing unit 105 serving as a developing portion. In addition, the image forming portion 101B includes a scanner unit 104 serving as an exposing portion, and a primary transfer roller 107.

The developing unit 105 includes a developing roller 105*a* serving as a developing member, and a toner container 105*b* that accommodates toner (developer). The developing roller 105*a* is rotatably held by the toner container 105*b*.

The process cartridge 195 is attachable to and detachable from the casing 101A. A toner cartridge 196 accommodating toner to be supplied to the developing unit 105 is detachably attached to the printer body 101. The "casing 101A" of the printer body 101 is a portion of the printer body 101 excluding the process cartridge 195 and the toner cartridge 196. The casing 101A includes a frame member such as a metal frame constituting a frame body of the printer body 101 and a member fixed to the frame body, and defines an attachment space in which the process cartridge 195 and the toner cartridge 196 are attached.

The process cartridge 195 forms a toner image for recording an image on a sheet S by using toner, and also forms a bonding toner image (adhesive layer) for bonding sheets S together. The printer body 101 of the present embodiment has a monochromatic printer configuration that records a monochromatic image. The printer body 101 uses a black toner not only for recording an image but also as a toner (powder adhesive) for bonding. The toner for bonding does not have to be a black toner, and may be a toner dedicated to bonding different from a toner used for recording an image. For example, the printer body 101 may include a process cartridge 195 accommodating toner (powder adhesive) dedicated to bonding in addition to a process cartridge 195 accommodating a color toner for recording an image.

The toner cartridge 196 and the process cartridge 195 attached to the casing 101A are connected to each other via a toner conveyance pipe 197. The toner cartridge 196 can supply toner to the developing unit 105 via the toner conveyance pipe 197.

The scanner unit 104 serving as the exposing portion is arranged in the casing 101A and below the process cartridge 195*k*. A cassette 113 (also referred to as a sheet tray or a storage chamber) serving as a storage portion that accommodates sheets S to be used for image formation is attached to the casing 101A at a position below the scanner unit 104 in such a manner that the cassette 113 can be drawn out. Further, one or more optional sheet feeding apparatuses 130 including an additional cassette 113 may be coupled to a lower portion of the casing 101A.

The intermediate transfer belt 108 is an endless belt that is movable (rotatable) and stretched over a driving roller 109*a*, a stretching roller 109*b*, and a tension roller 110 that rotate about axes parallel to each other. The intermediate transfer belt 108 is moved (rotated or conveyed) in a counterclockwise direction in FIG. 1 by rotation of the driving roller 109*a*. A primary transfer roller 107 serving as a primary transfer member is disposed on the inner peripheral side of the intermediate transfer belt 108 at a position opposing the photosensitive drum 102 with the intermediate transfer belt 108 therebetween. A secondary transfer roller 111 serving as a transfer member (secondary transfer member) is disposed on the outer peripheral side of the intermediate transfer belt 108 at a position opposing the driving roller 109*a* with the intermediate transfer belt 108 therebetween. As a nip portion between the intermediate transfer belt 108 and the secondary transfer roller 111, a secondary transfer portion serving as a transfer portion is formed. The intermediate transfer belt 108, the primary transfer roller 107, and the secondary transfer roller 111 constitute a transfer unit (transfer mechanism) for transferring a toner image formed on the photosensitive drum 102 serving as an image bearing member onto the sheet S.

A belt cleaner 112 serving as a cleaning portion that cleans the intermediate transfer belt 108 is provided at a position opposing the tension roller 110 with the intermediate transfer belt 108 therebetween. The belt cleaner 112 includes a cleaning member 112*a* such as a blade or a brush provided in contact with the intermediate transfer belt 108, and a waste toner container 198 serving as a collection container. The belt cleaner 112 removes an attached matter such as transfer residual toner from the intermediate transfer belt 108 by the cleaning member 112*a*, and collects the removed attached matter to the waste toner container 198.

A fixing unit 118 serving as a fixing portion is disposed above the secondary transfer portion in the casing 101A. The fixing unit 118 has a configuration of a thermal fixation system that fixes a toner image by heating. The fixing unit 118 includes a rotary member pair (for example, a roller pair constituted by a fixing roller and a pressurizing roller) that nip and convey the sheet S, and a heat source (for example, a halogen lamp or an induction heating mechanism) that heats the toner image on the sheet S via the fixing roller.

Image Forming Operation

In the case where the printer body 101 executes the image forming operation, the sheet S is fed from the cassette 113 in a lower portion of the casing 101A or the cassette 113 of the sheet feeding apparatus 130 by a feed roller 114 serving as a feeding portion. A separation roller pair 115 conveys the fed sheet S while separating one sheet S from a plurality of sheets S when a plurality of sheets S are fed. This sheet S is conveyed toward a registration roller pair 117 by a pull-out roller 116, and the skew of the sheet S is corrected as a result of the leading end of the sheet S abutting a nip portion of the registration roller pair 117 in a stopped state. The registration roller pair 117 delivers the sheet S into the secondary transfer portion at a timing synchronized with progress of a toner image formation process by the image forming portion 101B.

Meanwhile, the photosensitive drum 102 and the intermediate transfer belt 108 are rotationally driven in the image forming portion 101B. The charging unit 103 uniformly charges the surface of the photosensitive drum 102. The scanner unit 104 draws an electrostatic latent image on the photosensitive drum 102 by irradiating the photosensitive drum 102 with laser light on the basis of image information representing an image to be recorded on the sheet S. This electrostatic latent image is developed (visualized) as a black toner image by being developed by the developing unit 105 by using black toner.

Here, in the case of performing heat-and-pressure bonding described below by the sheet processing apparatus 106, the scanner unit 104 irradiates the photosensitive drum 102 with laser light on the basis of information designating a bonding position on the sheet S, and thus draws an electrostatic latent image on the photosensitive drum 102. This electrostatic latent image is developed by the developing unit 105 by using black toner, and thus a bonding toner image is formed in a region on the photosensitive drum 102 corresponding to a bonding position on the sheet S.

The toner image formed on the photosensitive drum 102 (image bearing member) is transferred (primary transfer) onto the intermediate transfer belt 108 by the primary transfer roller 107, and is conveyed toward the secondary transfer portion by the rotation of the intermediate transfer belt 108. Then, a voltage is applied to the secondary transfer roller 111, and thus the toner image is transferred (secondary transfer) onto the sheet S delivered thereto from the registration roller pair 117. The sheet S having passed through the secondary transfer portion is delivered into the fixing unit 118, the toner image is softened by being heated and pressurized while the sheet S passes through the nip portion between the fixing roller and the pressurizing roller and then adheres to the sheet S, and thus an image is fixed to the sheet S.

The conveyance path for the sheet S having passed through the fixing unit 118 is switched by a switching portion 119. In the case of simplex printing, the sheet S is guided to a discharge path 190 by the switching portion 119, and is discharged from the casing 101A by a discharge roller pair 191. In the present embodiment, the printer body 101 is coupled to the sheet processing apparatus 106 via a relay conveyance unit 192. The sheet S discharged from the discharge roller pair 191 is passed onto the sheet processing apparatus 106 via conveyance roller pairs 193 and 194 of the relay conveyance unit 192. In addition, in the case where the relay conveyance unit 192 and the sheet processing apparatus 106 are not coupled, the discharge roller pairs 191 discharge the sheet S as a product onto a supporting tray 135 provided in an upper portion of the casing 101A.

In the case of duplex printing, the sheet S on a first surface of which an image has been formed is guided to a reverse conveyance roller pair 199 by the switching portion 119. Then, the sheet S is reversed and conveyed (switchback conveyance) by the reverse conveyance roller pair 199, and is then conveyed toward the registration roller pair 117 through a duplex conveyance path 218. The sheet S passes through the secondary transfer portion and the fixing unit 118, thus an image is formed on a second surface of the sheet S opposite to the first surface, and then the sheet S is discharged from the casing 101A by the discharge roller pair 191.

Figure 2:
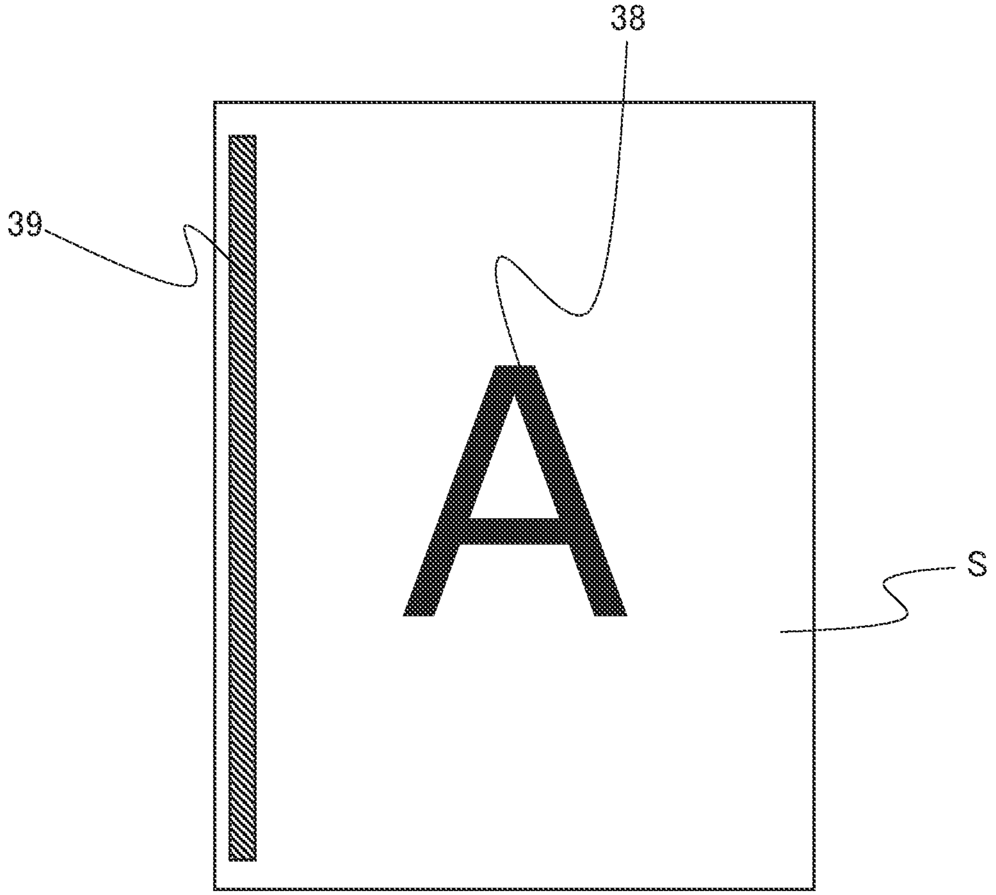
FIG. 2 is a diagram illustrating an example of a toner image formed on a sheet by a printer body according to the first embodiment.

FIG. 2 is a diagram illustrating an example of toner images formed on the sheet S. On the illustrated sheet S, a toner image (recording toner image) 38 for recording an image such as a text, a figure, or a photograph, and a toner image (bonding toner image) 39 for bonding sheets together are formed. The position, shape, width, and the like of the bonding toner image 39 can be changed in accordance with the configuration of a heat-and-pressure bonding portion 167 that will be described later.

To be noted, in the case where the image forming apparatus 100 creates a booklet by simplex printing, the bonding toner image 39 is formed on only one surface (the same surface as the recording toner image) of the sheet S. In the case of a booklet formed by duplex printing, the bonding toner image 39 may be formed on only one surface of the sheet S, or may be formed on both surfaces of the sheet S.

Sheet Processing Apparatus

The sheet processing apparatus 106 includes a buffering portion 120 serving as a buffering portion (stacking portion) in which a plurality of sheets S are stacked, an alignment portion 156 serving as an alignment mechanism that aligns the plurality of sheets S, and a heat-and-pressure bonding portion 167 that performs heat-and-pressure bonding of the sheets S. The heat-and-pressure bonding portion 167 is an example of a sheet bonding apparatus (booklet making apparatus, bonding unit, bonding portion, heat-and-pressure bonding mechanism, or sticking processing portion) that makes a booklet by bonding sheets together. In addition, the sheet processing apparatus 106 includes an upper discharge tray 125 and a lower discharge tray 137 each capable of ascending and descending as a discharge destination to which the product of the image forming apparatus 100 is to be discharged.

The sheet processing apparatus 106 is a sheet processing apparatus that receives the plurality of sheets S that are subjected to image formation by the printer body 101 one by one, performs a bonding process (heat-and-pressure bonding) on the received sheets S, and discharges the sheets S as a sheet bundle (booklet). The buffering portion 120, the alignment portion 156, and the heat-and-pressure bonding portion 167 will be described in detail later. In addition, the sheet processing apparatus 106 can also discharge a sheet S on which an image has been formed by the printer body 101 onto the upper discharge tray 125 or the lower discharge tray 137 without performing the process on the sheet S.

Buffering Portion

Figure 3:
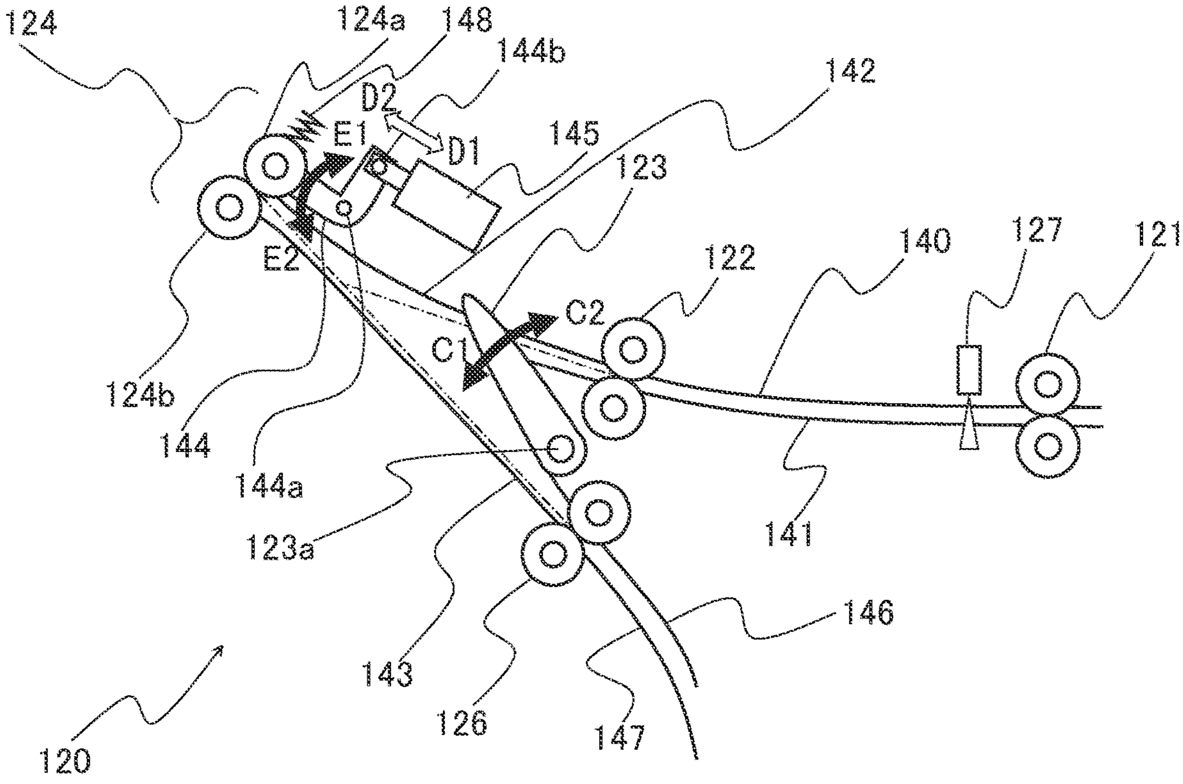
FIG. 3 is a diagram illustrating a buffering portion of a sheet processing apparatus according to the first embodiment.

The buffering portion 120 will be described with reference to FIG. 3. FIG. 3 is an enlarged view of a cross-section of the buffering portion 120. The buffering portion 120 includes an inlet roller pair 121, a pre-buffer roller pair 122, a non-return member 123, a reverse conveyance roller pair 124, and an inner discharge roller pair 126. In addition, the buffering portion 120 includes an inlet sensor 127 that detects the sheet, and a separation mechanism constituted by a plunger solenoid 145 and the like for bringing the reverse conveyance roller pair 124 into and out of contact. The separation mechanism can also be said as an opening/closing mechanism for opening and closing the reverse conveyance roller pair 124, or as a detaching mechanism for detaching the reverse conveyance roller pair 124.

The inlet roller pair 121, the pre-buffer roller pair 122, the reverse conveyance roller pair 124, and the inner discharge roller pair 126 are each a roller pair that nips and conveys a sheet. The inlet roller pair 121 and the pre-buffer roller pair 122 are disposed in a conveyance path (inlet path) for the sheet processing apparatus 106 to receive the sheet S. The reverse conveyance roller pair 124 is disposed in a conveyance path 139 (first discharge path, see FIG. 1) communicating with the upper discharge tray 125. The inner discharge roller pair 126 is disposed in a conveyance path 166 (inner discharge path illustrated in FIG. 1) from the reverse conveyance roller pair 124 toward the heat-and-pressure bonding portion 167. To be noted, the sheet processing apparatus 106 includes a conveyance path 138 (second discharge path, see FIG. 1) from the heat-and-pressure bonding portion 167 toward the lower discharge tray 137.

The inlet path is defined by an upper inlet guide 140 and a lower inlet guide 141. A first discharge path is defined by an upper reverse guide 142 and a lower reverse guide 143. The conveyance path 166 (inner discharge path) is defined by an upper inner discharge guide 146 and a lower inner discharge guide 147.

The inlet sensor 127 is disposed to detect the sheet received by the inlet roller pair 121. As the inlet sensor 127, for example, a reflective photosensor that determines presence or absence of the sheet S by emitting infrared light into the inlet path through an opening provided in the upper inlet guide 140 and detecting reflected light from the sheet S can be used. A hole having a diameter equal to or larger than the spot diameter of the infrared light emitted from the inlet sensor 127 may be provided in the lower inlet guide 141 such that the infrared light is not reflected when the sheet is not passing through the inlet path.

The non-return member 123 is a guide member disposed downstream of the pre-buffer roller pair 122 in a sheet conveyance direction in the inlet path. The non-return member 123 is disposed to be rotatable about a rotation shaft 123*a* with respect to the upper inner discharge guide 146. The non-return member 123 is movable to a first position where (backward) movement of the sheet from the first discharge path to the inlet path is suppressed and a second position where movement of the sheet from the inlet path to the first discharge path is allowed. The non-return member 123 is urged in a C2 direction from the second position toward the first position by an unillustrated spring. The non-return member 123 is configured to move in the C1 direction from the first position toward the second position by being pressed by the sheet, and return to the first position after the sheet passes.

As viewed in the rotational axis direction of the non-return member 123, a distal end portion of the non-return member 123 at the first position overlaps with the upper reverse guide 142. In addition, the distal end portion of the non-return member 123 is formed in a comb shape so as to enable the overlap with the upper reverse guide 142. In addition, as viewed in the rotational axis direction of the non-return member 123, a space that the sheet can pass through is defined between the non-return member 123 at the second position and the upper reverse guide 142.

The reverse conveyance roller pair 124 is constituted by an upper reverse conveyance roller 124*a* and a lower reverse conveyance roller 124*b*, and drive is supplied to both of these rollers. The upper reverse conveyance roller 124*a* and the lower reverse conveyance roller 124*b* are configured such that the rotations thereof are always synchronized. In addition, a separation lever 144 (detaching lever) is coupled to the upper reverse conveyance roller 124*a*. The separation lever 144 is supported so as to be pivotable about a lever support shaft 144*a* with respect to the upper reverse guide 142. In addition, the separation lever 144 is rotatably coupled to the plunger solenoid 145 via a solenoid coupling shaft 144*b*.

When a current is supplied to the plunger solenoid 145, the core moves in a D1 direction in FIG. 3, and therefore the separation lever 144 pivots in an E1 direction in FIG. 3. In this case, the reverse conveyance roller pair 124 takes a separated state in which the upper reverse conveyance roller 124*a* and the lower reverse conveyance roller 124*b* are separated (state in which the nip portion is open, detachment state). In addition, in the case where the current flowing in the plunger solenoid 145 is stopped, the upper reverse conveyance roller 124*a* moves in an E2 direction by an urging force of a compression spring 148, and the core of the plunger solenoid 145 moves in a D2 direction. In this case, the reverse conveyance roller pair 124 takes a contact state in which the upper reverse conveyance roller 124*a* and the lower reverse conveyance roller 124*b* are in contact with each other (state in which the nip portion is formed).

Buffering Operation

Next, the operation of the buffering portion 120 will be described. FIGS. 4A to 4H are diagrams illustrating the operation of the buffering portion 120. In the description below, it is assumed that a sheet S1, a sheet S2, and a sheet S3 are conveyed from the printer body 101 to the sheet processing apparatus 106 in this order.

The buffering portion 120 performs a buffering operation (stacking operation) in which a newly conveyed sheet is stacked on a sheet (or a sheet bundle) while the sheet (or the sheet bundle) is reciprocated between the reverse conveyance roller pair 124 and the inner discharge roller pair 126. In the present embodiment, a plurality of sheets that are stacked in the buffering portion 120 and are not bonded and a plurality of sheets as one copy of product having undergone the heat-and-pressure bonding in the heat-and-pressure bonding portion 167 are each referred to as a “sheet bundle”, but the former may be referred to as a sheet stack and distinguished from a bonded sheet bundle.

In addition, the sheet processing apparatus 106 increases the sheet conveyance speed in the apparatus. In the description below, the sheet conveyance speed of the inlet roller pair 121 will be denoted by V1, and the sheet conveyance speed of the pre-buffer roller pair 122, the reverse conveyance roller pair 124, and the inner discharge roller pair 126 (sheet conveyance speed after acceleration) will be denoted by V2.

Figure 4A:
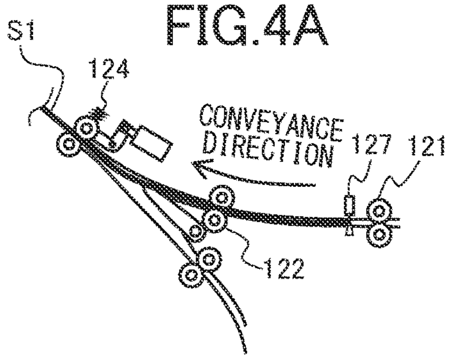
FIGS. 4A to 4H are diagrams illustrating an operation of a buffering portion according to the first embodiment.

As illustrated in FIG. 4A, when the trailing end of a preceding sheet S1 passes the inlet sensor 127, the conveyance speed of the sheet S1 by the pre-buffer roller pair 122 and the reverse conveyance roller pair 124 is increased from V1 to V2. As a result of this, the conveyance interval between the sheet S1 and a succeeding sheet S2 increases, and therefore the reverse conveyance roller pair 124 can switch back the sheet S1 without the sheet S1 colliding with the sheet S2.

Figure 4B:
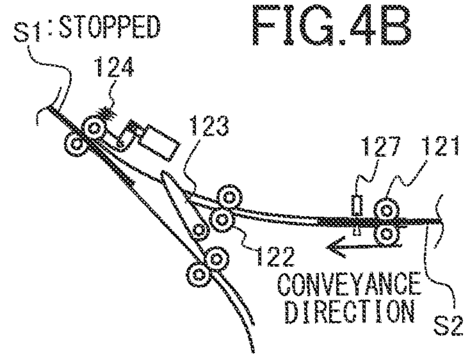

As illustrated in FIG. 4B, when the trailing end of the sheet S1 passes the non-return member 123, the conveyance by the reverse conveyance roller pair 124 is temporarily stopped.

Figure 4C:
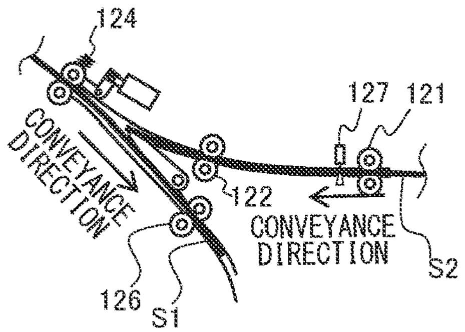

As illustrated in FIG. 4C, the reverse conveyance roller pair 124 changes the rotational direction thereof, and conveys the sheet S1 toward the inner discharge roller pair 126.

Figure 4D:
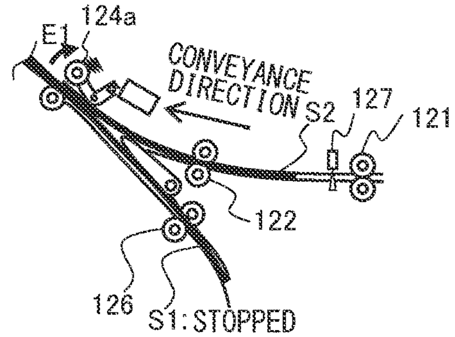

As illustrated in FIG. 4D, the conveyance of the sheet S1 by the reverse conveyance roller pair 124 and the inner discharge roller pair 126 is stopped at a position where the leading end of the sheet S1 has passed the inner discharge roller pair 126 by a predetermined amount. In addition, the upper reverse conveyance roller 124*a* moves in the E1 direction after the sheet S1 is nipped by the inner discharge roller pair 126. As a result of this, the reverse conveyance roller pair 124 is separated, and thus it becomes possible to receive the succeeding sheet S2. After the upper reverse conveyance roller 124*a* is retracted, the succeeding sheet S2 is conveyed to the reverse conveyance roller pair 124.

Figure 4E:
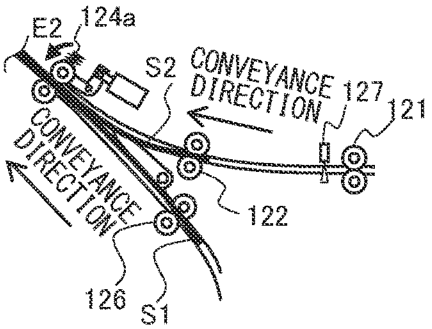

As illustrated in FIG. 4E, when the trailing end of the succeeding sheet S2 passes the inlet sensor 127, the conveyance speed of the sheet S2 is increased from V1 to V2 similarly to the sheet S1. The inner discharge roller pair 126 conveys the sheet S1 toward the reverse conveyance roller pair 124 at a timing at which the sheet S2 reaches a predetermined target position. At a timing at which the speed of the sheet S1 and the speed of the sheet S2 are approximately equal (speed difference is substantially 0), the upper reverse conveyance roller 124*a* moves in the E2 direction, and the reverse conveyance roller pair 124 takes the contact state. At the time of contact, the reverse conveyance roller pair 124 simultaneously nips the sheets S1 and S2. In addition, the speed of the reverse conveyance roller pair 124 is adjusted so as to be equal to the conveyance speed of the sheets S1 and S2 before switching from the separated position to the contact position.

Figure 4F:
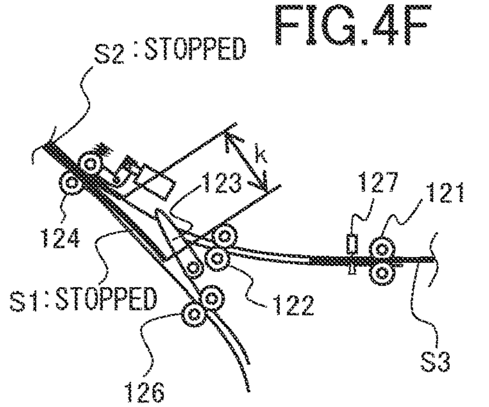

As illustrated in FIG. 4F, after the trailing end of the sheet S2 has passed the non-return member 123, the reverse conveyance roller pair 124 temporarily stops again. Here, the target position described above is set such that the sheet S1 projects more than the sheet S2 by a predetermined amount k in the conveyance direction from the inner discharge roller pair 126 toward the alignment portion 156. In other words, in the sheet bundle stacked in the buffering portion 120, the sheet S1 that is on the lower side in the alignment portion 156 projects downstream in the conveyance direction toward the alignment portion 156 more than the sheet S2 that is on the upper side in the alignment portion 156 by the predetermined amount k.

Figure 4G:
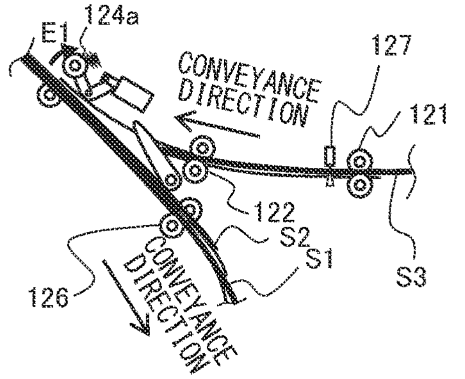

As illustrated in FIG. 4G, the reverse conveyance roller pair 124 changes the rotational direction thereof, and conveys the sheets S1 and S2 toward the inner discharge roller pair 126. The sheets S1 and S2 are conveyed toward the alignment portion 156 by the inner discharge roller pair 126. The upper reverse conveyance roller 124*a* moves in the E1 direction after the sheet S1 is nipped by the inner discharge roller pair 126. As a result of this, the reverse conveyance roller pair 124 is separated, and thus it becomes possible to receive the succeeding sheet S3.

Figure 4H:
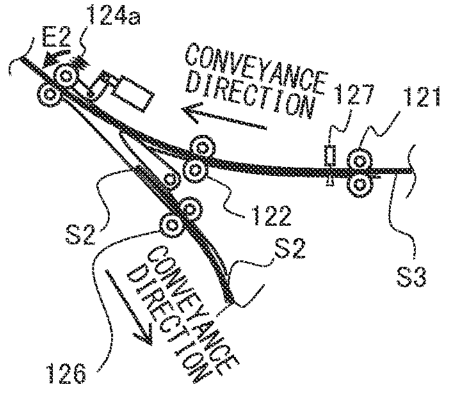

As illustrated in FIG. 4H, after the trailing end of the sheet S2 has passed the reverse conveyance roller pair 124, the upper reverse conveyance roller 124*a* moves in the E2 direction. As a result of this, the reverse conveyance roller pair 124 takes the contact state, and nips and conveys the sheet S3.

By repeatedly performing the buffering operation described above, the buffering portion 120 can deliver a stack of a predetermined number of sheets to the alignment portion 156. In addition, although a buffering operation of stacking two sheets has been described as an example, the sheet S3 can be further stacked on the sheets S1 and S2 by temporarily stopping the conveyance of the sheets S1 and S2 in the state of FIG. 4G and then conveying the sheets S1 and S2 in a reverse direction. That is, the buffering portion 120 can create a sheet bundle in which three or more (for example, five) sheets are stacked by repeating the operation of FIGS. 4D to 4G.

To be noted, the target position for the stacking of sheets is determined on the basis of the timing at which the trailing end of the sheet is detected by the inlet sensor 127. Therefore, the sheets can be stacked in a state of being displaced from each other by predetermined amounts by the buffering operation of the present embodiment even if the length of the sheet in the conveyance direction changes.

As illustrated in FIG. 1, the sheet bundle stacked in the buffering portion 120 is conveyed from the inner discharge roller pair 126 to an intermediate conveyance roller pair 128 and then a kick-out roller pair 129. Then, the sheet bundle is conveyed by the kick-out roller pair 129 to the alignment portion 156 (intermediate supporting portion or processing stage) constituted by an upper intermediate guide 151, a lower intermediate guide 152, and the like. In addition, a pressing flag 150 that suppresses lifting of the trailing end of a sheet that has been already stacked, such that the trailing end of the sheet that has been already stacked in the alignment portion 156 and the leading end of the succeeding sheet conveyed to the alignment portion 156 do not interfere with each other, is disposed downstream of the kick-out roller pair 129.

Alignment Portion

Figure 5:
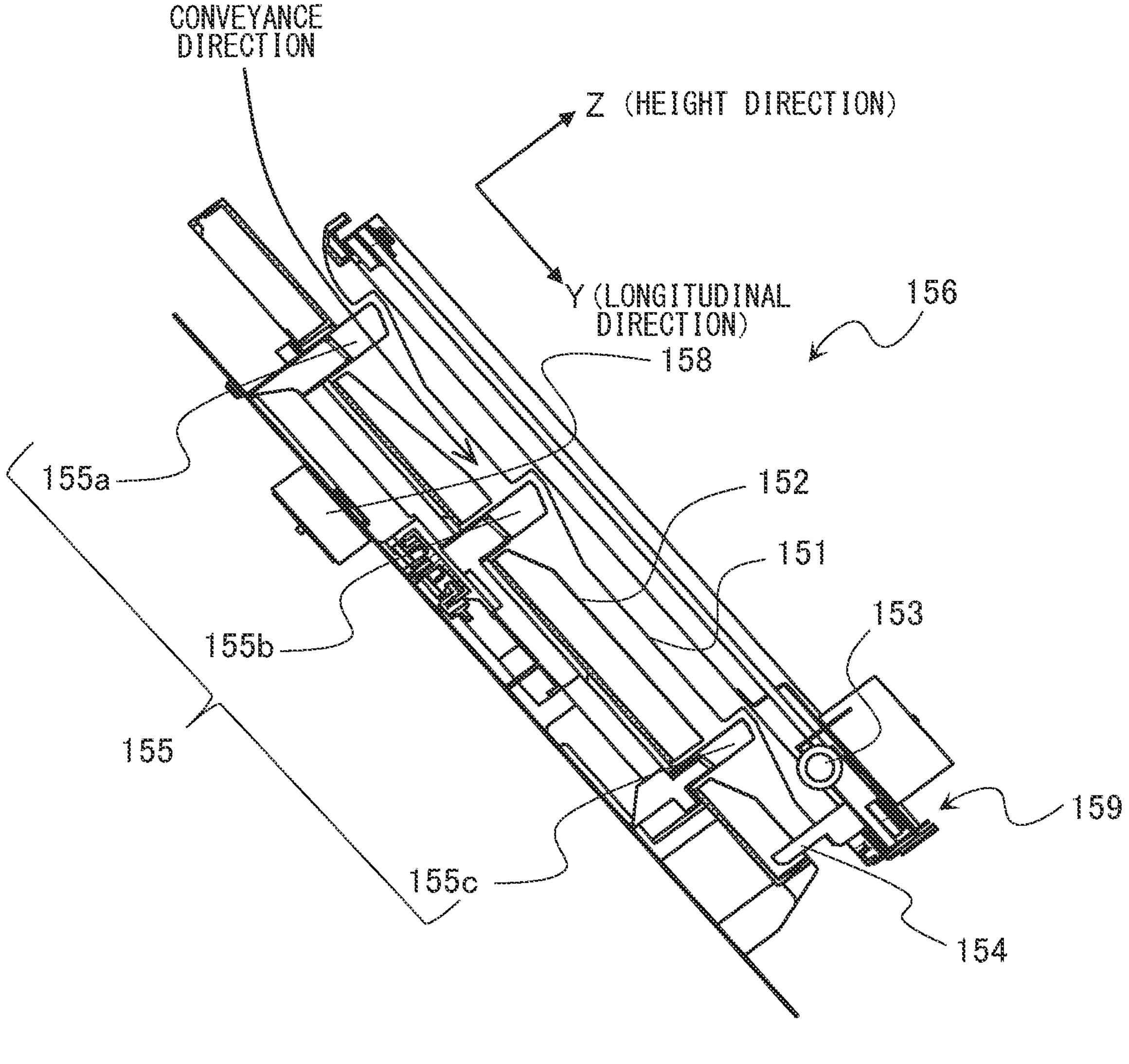
FIG. 5 is a diagram illustrating an alignment portion of the sheet processing apparatus according to the first embodiment.
Figure 6:
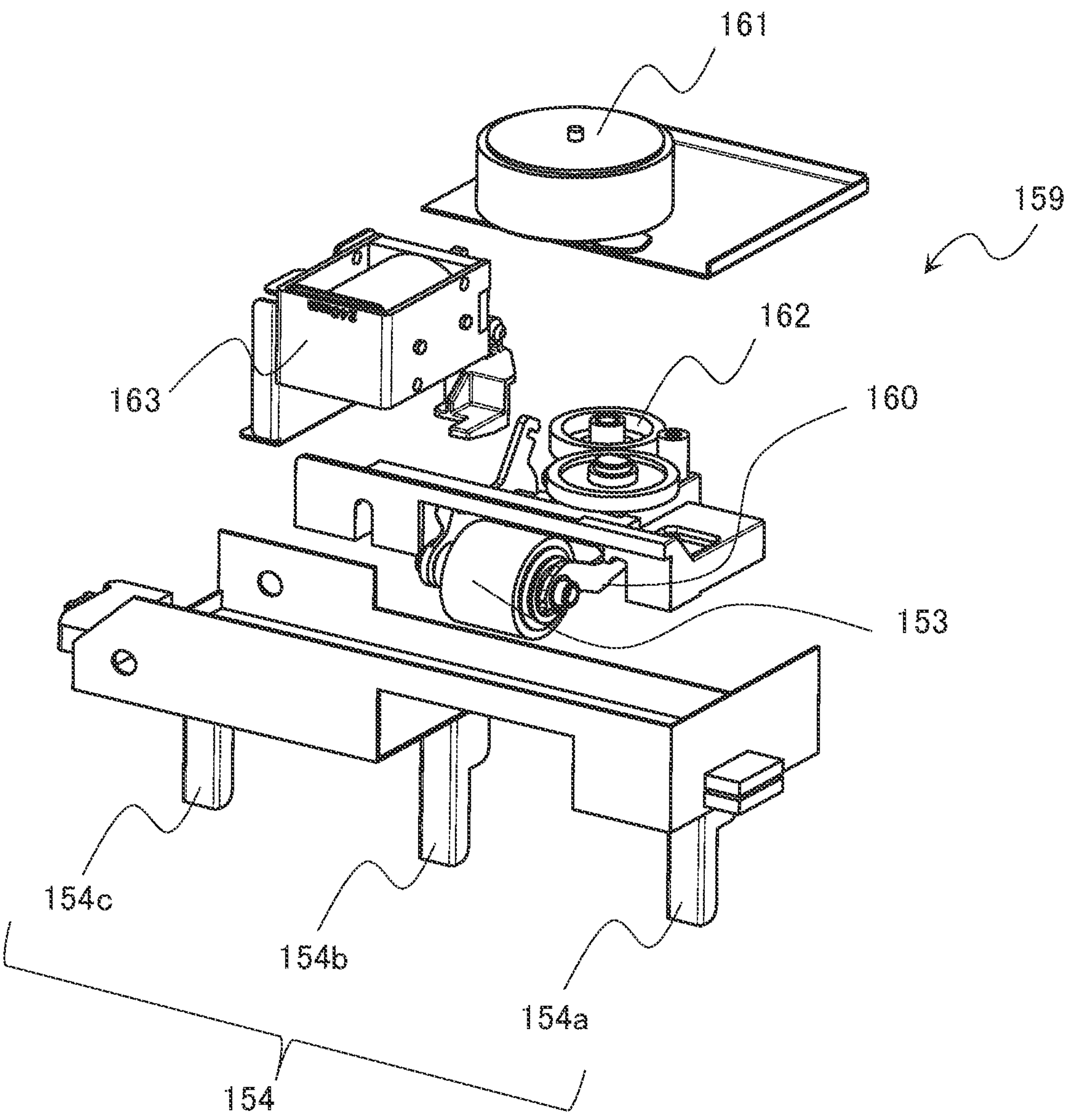
FIG. 6 is a diagram illustrating a movable unit of the alignment portion according to the first embodiment.

Next, the configuration of the alignment portion 156 will be described with reference to FIGS. 5 and 6. FIG. 5 is a section view of the alignment portion 156. FIG. 6 is a diagram illustrating constituent elements of a movable unit 159 in an exploded state.

In the description and drawings below, a direction in which the pressurizing member (pressurizing plate 169) of the heat-and-pressure bonding portion 167 moves with respect to the receiving member (receiving plate 180) to pressurize a sheet will be referred to as a Z direction. The Z direction is a height direction (thickness direction) of the sheets stacked in the alignment portion 156. In addition, directions orthogonal to each other in a virtual plane orthogonal to the Z direction will be referred to as an X direction and a Y direction. If necessary, directions of arrows X, Y, and Z illustrated in each drawing will be respectively expressed as a +X direction, a +Y direction, and a +Z direction, and directions opposite thereto will be respectively expressed as a −X direction, a −Y direction, and a −Z direction. In addition, +Z direction may be referred to as "upward" and −Z direction may be referred to as "downward".

In the present embodiment, the Y direction is substantially parallel to the conveyance direction in which the sheet is conveyed to the alignment portion 156 by the kick-out roller pair 129. In addition, in the present embodiment, the X direction is a sheet width direction orthogonal to the conveyance direction. In the description below, the Y direction may be sometimes referred to as a "longitudinal direction", and the X direction may be sometimes referred to as a "sheet width direction" or a "lateral direction".

The alignment portion 156 includes a lower intermediate guide 152 serving as a supporting portion that supports sheets, an upper intermediate guide 151 opposing the lower intermediate guide 152, and the movable unit 159 including a longitudinal alignment standard plate 154 and a longitudinal alignment roller 153.

As illustrated in FIG. 6, the longitudinal alignment standard plate 154 includes sheet abutting portions 154*a*, 154*b*, and 154*c* arranged in the sheet width direction. The sheet abutting portions 154*a*, 154*b*, and 154*c* serve as standard positions for sheet alignment in the sheet conveyance direction (Y direction). The longitudinal alignment roller 153 is rotatably held by a roller holder 160. The roller holder 160 is capable of swinging by a driving force of a solenoid 163. As a result of the swing of the roller holder 160, the longitudinal alignment roller 153 is movable to a position where the longitudinal alignment roller 153 abuts the sheet S on the lower intermediate guide 152 and a position where the longitudinal alignment roller 153 is retracted in the +Z direction from the sheet S.

In addition, a driving motor 161 is attached to the movable unit 159. As a result of the driving force of the driving motor 161 being transmitted via a gear train 162, the longitudinal alignment roller 153 rotates. The movable unit 159 is movable as an integral unit in the sheet conveyance direction (Y direction) with respect to the lower intermediate guide 152.

As illustrated in FIG. 5, the alignment portion 156 includes a width alignment member 155, a driving motor

Figure 7A:
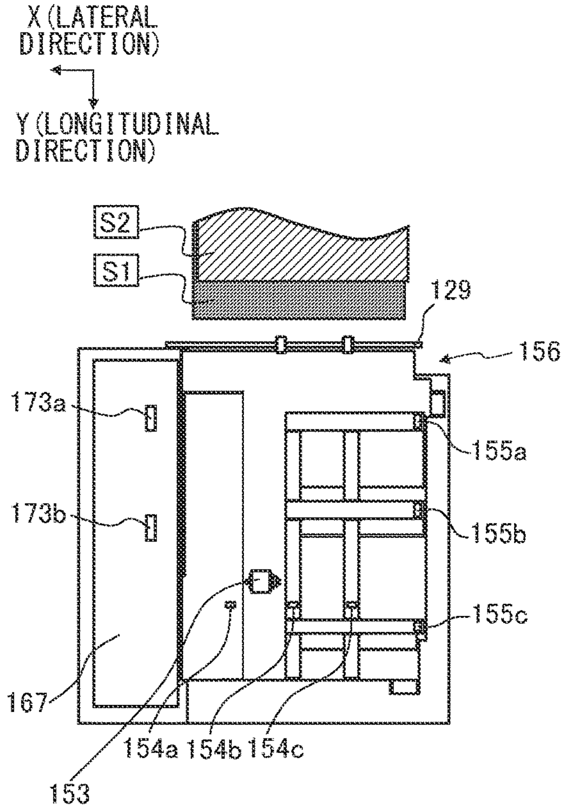
FIGS. 7A to 7D are diagrams illustrating an operation of the alignment portion according to the first embodiment.

158, and width alignment standard plates 173*a* and 173*b* illustrated in FIG. 7A. The width alignment member 155 is movable in the sheet width direction (X direction) by the driving force of the driving motor 158. The width alignment member 155 includes a plurality of sheet pressing portions 155*a*, 155*b*, and 155*c* arranged in the sheet conveyance direction. As illustrated in FIG. 7A, the width alignment standard plates 173*a* and 173*b* are a plurality of plate-like members (sheet abutting portions) arranged in the sheet conveyance direction. The width alignment standard plates 173*a* and 173*b* serve as standard positions for sheet alignment in the sheet width direction (X direction).

Alignment Operation

The operation of the alignment portion 156 will be described with reference to FIGS. 7A to 7D. FIGS. 7A to 7D are each a schematic view of the alignment portion 156 as viewed from above in the Z direction. Illustration of elements related to driving of the upper intermediate guide 151 and the heat-and-pressure bonding portion 167 is omitted.

In the case of aligning sheets in the alignment portion 156, the movable unit 159 is positioned at a predetermined standby position in the sheet conveyance direction (Y direction) in advance in accordance with the sheet size, and conveyance of the sheet is waited for. The standby position is a position where the distance from the nip position of the kick-out roller pair 129 to the sheet abutting portions 154*a* to 154*c* of the longitudinal alignment standard plate 154 in the Y direction is slightly larger than the length of the sheet.

The operation of the alignment portion 156 will be described below by taking a case where a sheet bundle constituted by five sheets S1 to S5 stacked in the buffering portion 120 is conveyed as an example. To be noted, the number of sheets in the sheet bundle stacked in the buffering portion 120 can be changed.

FIG. 7A illustrates a state in which the first sheet S1 and the second sheet S2 are about to be conveyed toward the alignment portion 156. The movable unit 159 (the longitudinal alignment standard plate 154 and the longitudinal alignment roller 153) has completed movement to the standby position corresponding to the sheet size. The width alignment member 155 stands by at a position slightly outward from a side end position of the sheet bundle so as not to interrupt the conveyance of the sheet bundle.

Figure 7B:
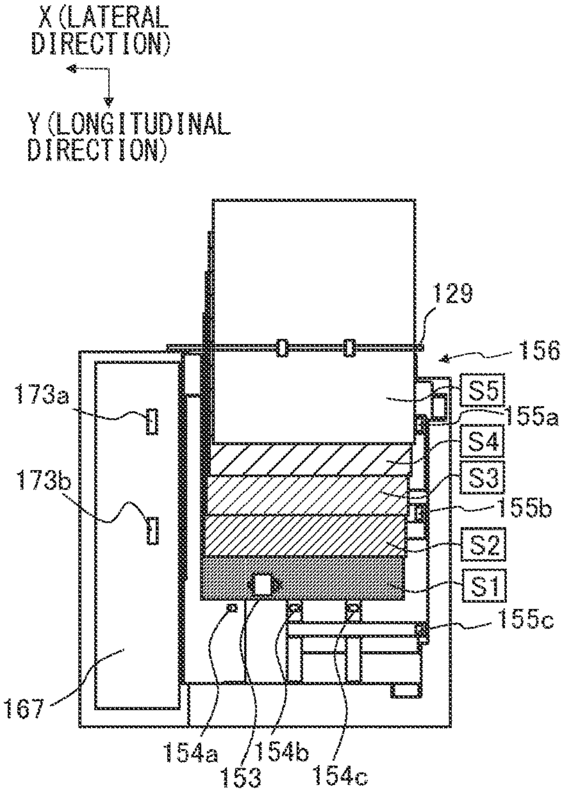

FIG. 7B illustrates a state in which the trailing end of the first sheet S1 has been released from the nip of the kick-out roller pair 129 and the leading end of the sheet S1 has reached the longitudinal alignment roller 153. The longitudinal alignment roller 153 has moved down to a contact position in advance in response to power supply to the solenoid 163, and is rotated by a driving motor 161.

The sheet S1 is aligned in the sheet conveyance direction by being conveyed in the +Y direction by the longitudinal alignment roller 153 and caused to abut the longitudinal alignment standard plate 154. Then, each time the succeeding sheets S2 to S5 are released from the kick-out roller pair 129, each sheet is conveyed in the +Y direction by the longitudinal alignment roller 153 and caused to abut the longitudinal alignment standard plate 154, and is thus aligned in the sheet conveyance direction.

Figure 7C:
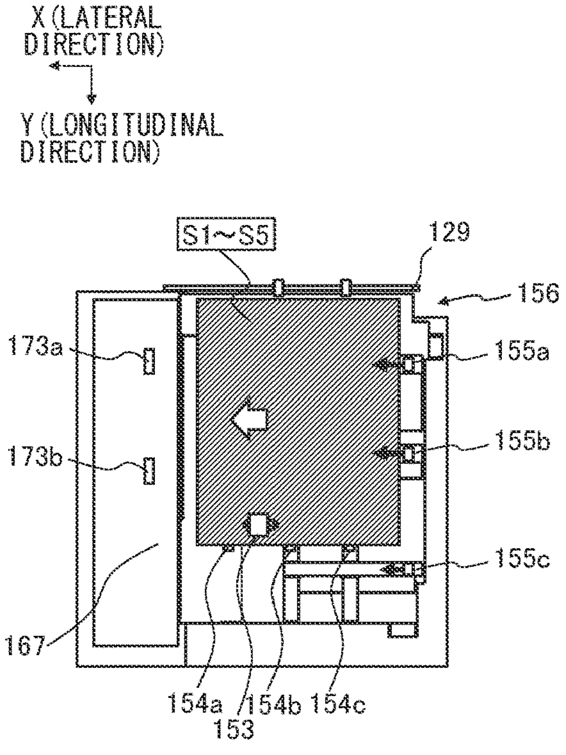

FIG. 7C illustrates a state in which the five sheets S1 to S5 are each caused to abut the longitudinal alignment standard plate 154 and alignment in the sheet conveyance direction is completed. In this state, the width alignment member 155 is moved in the sheet width direction (X direction) by the driving force of the driving motor 158 illustrated in FIG. 5). One side end of the sheets S1 to S5 is pressed by the sheet pressing portions 155*a*, 155*b*, and 155*c* of the width alignment member 155, and thus the sheets S1 to S5 move toward the width alignment standard plates 173*a* and 173*b*.

Figure 7D:
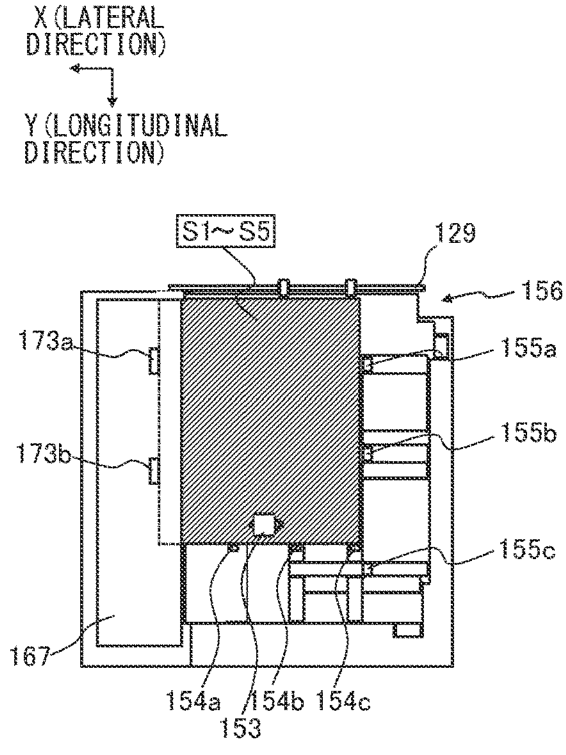

FIG. 7D illustrates a state in which side ends of the sheets S1 to S5 are respectively caused to abut the width alignment standard plates 173*a* and 173*b*. As a result of this, the sheets S1 to S5 are aligned in the sheet width direction. After this, heat-and-pressure bonding of the five sheets S1 to S5 is performed by the heat-and-pressure bonding portion 167 that will be described later. In addition, in the case of creating a booklet constituted by six or more sheets, the alignment portion 156 is prepared to receive the sixth and later sheets in parallel with the heat-and-pressure bonding of the sheets S1 to S5. Specifically, the width alignment member 155 is moved in a retracting direction (−X direction).

Heat-and-Press Bonding Portion

Figure 8:
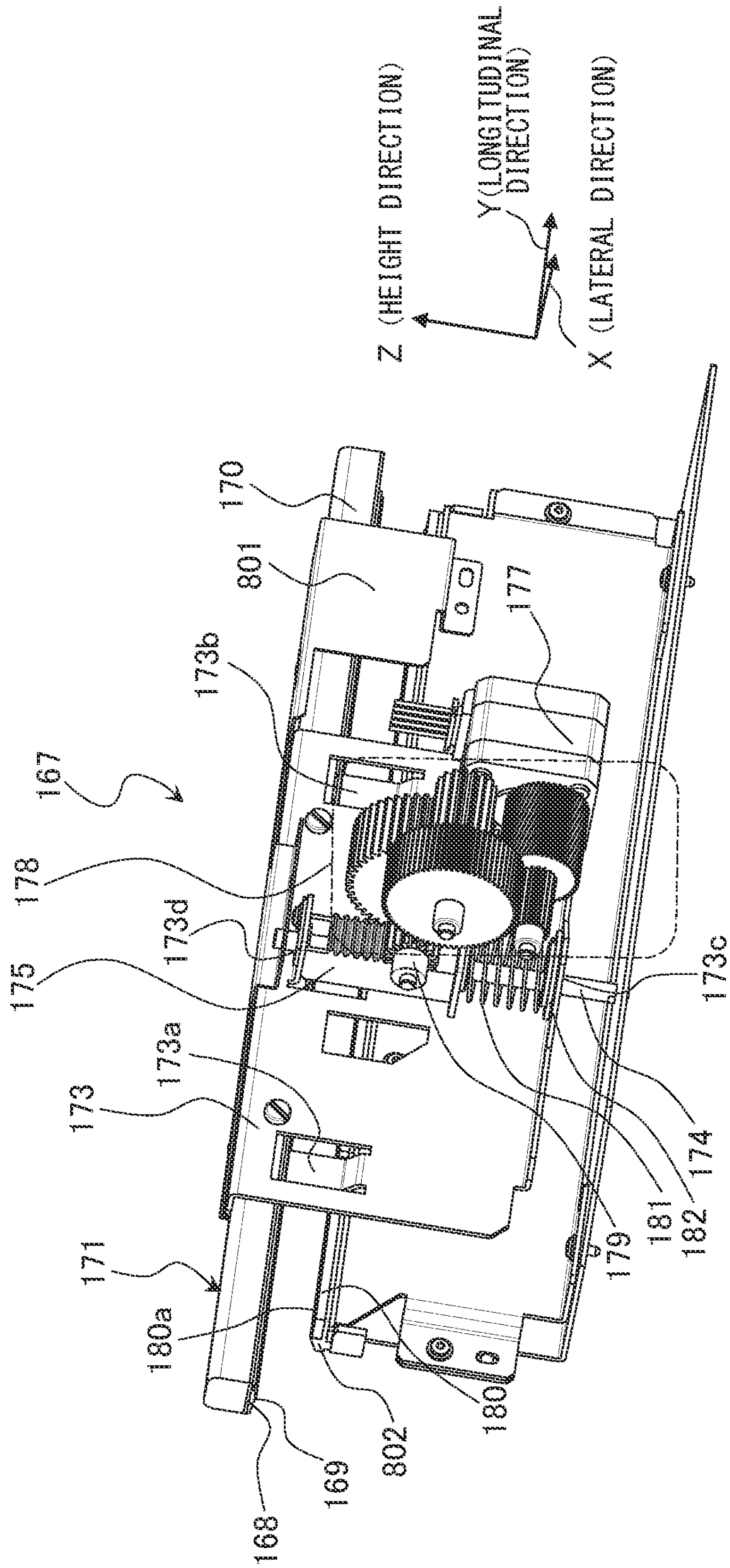
FIG. 8 is a diagram illustrating a heat-and-press bonding portion according to the first embodiment.

The configuration of the heat-and-press bonding portion 167 according to the present embodiment will be described with reference to FIG. 8. FIG. 8 is a perspective view of the heat-and-press bonding portion 167.

The heat-and-press bonding portion 167 is an example of a sheet bonding apparatus (booklet making apparatus, bonding unit, bonding portion, heat-and-press bonding mechanism, or sticking processing portion) that bonds sheets together. As illustrated in FIG. 8, the heat-and-press bonding portion 167 includes a heater portion 171 including a pressurizing plate 169 and a heater 168, a receiving plate 180 opposing the pressurizing plate 169, and a driving system 167D that drives the heater portion 171. The driving system 167D includes a motor 177 serving as a drive source, a gear train 178, a pinion gear 179, and a rack gear 175.

In addition, the heat-and-press bonding portion 167 includes a compression spring 181, a sheet separation member 172 illustrated in FIG. 9A that will be described later, a support member 801 that supports part of the sheet separation member 172, and a support member 802 that supports the receiving plate 180. The support members 801 and 802 are members supported by the frame body of the heat-and-press bonding portion 167 and fixed to the frame body. The support member 801 is, for example, a metal plate member.

The pressurizing plate 169 is an example of a pressurizing member (first pressurizing member). The receiving plate 180 is an example of a receiving member (second pressurizing member) opposing the pressurizing member. The pressurizing plate 169 opposes a first surface (surface on the +Z side, hereinafter referred to as an upper surface) of the sheet bundle during heat-and-press bonding. The receiving plate 180 opposes a second surface (surface on the −Z side, hereinafter referred to as a lower surface) of the sheet bundle opposite to the first surface during heat-and-press bonding, and nips the sheet bundle together with the pressurizing plate 169. The driving system 167D is an example of a moving portion (driving portion) that moves the pressurizing plate 169. The heater 168 is an example of a heating portion that heats the sheet bundle.

The receiving plate 180 is formed from an elastic material (elastomer), for example, silicone rubber. The receiving plate 180 is fixed to a frame body of the heat-and-press bonding portion 167, and receives the pressurizing force of the heater portion 171. The receiving plate 180 has a plate shape elongated in the Y direction and having the Z direction as the thickness direction. The receiving plate 180 has a sheet contact surface 180*a* that comes into contact with the lower surface of the sheet bundle. The sheet contact surface 180*a* of the present embodiment is a flat surface spreading substantially orthogonally with respect to the Z direction. In the present embodiment, an example in which the sheet bundle is pressurized by the pressurizing plate 169 (first pressurizing member) moving toward the receiving plate 180 (second pressurizing member) during heat-and-press bonding will be described. To be noted, the sheet bundle may be pressurized by the pressurizing plate 169 and the receiving plate 180 moving closer to each other.

The heater portion 171 includes the pressurizing plate 169 and a metal stay 170. In addition, the heater portion 171 is held by a lift plate 173 serving as a holding member. The heater portion 171 and the lift plate 173 serve as a pressurizing unit (heating unit) that moves integrally.

The pressurizing plate 169 has a plate shape elongated in the Y direction and having the Z direction as the thickness direction. The pressurizing plate 169 is formed from, for example, aluminum. The heat-and-press bonding portion 167 can perform heat-and-press bonding of the sheet bundle stacked in the alignment portion 156 along one side extending in the Y direction, by using the pressurizing plate 169. The alignment portion 156 and the heat-and-press bonding portion 167 of the present embodiment can perform so-called long-side binding in which sheets of, for example, the A4 size are aligned in a direction (long-side feeding direction) in which the long side thereof is parallel to the sheet conveyance direction and subjected to heat-and-press bonding in a bonding region illustrated in FIG. 2 extending along the long side. To be noted, a binding method other than the long-side binding may be performed by changing the shapes of the pressurizing plate 169 and the receiving plate 180, the position of the heat-and-press bonding portion 167, and the like.

The pressurizing plate 169 has a sheet contact surface **169*a* (first contact surface) that comes into contact with the upper surface of the sheet bundle. The contact surface 169*a* of the present embodiment includes a ridge portion that is a protruding shape illustrated in FIG. 9A whose center portion in the X direction protrudes more in the pressurizing direction (−Z direction) than end portions thereof in the X direction and which extends in the Y direction. By providing the protruding shape (ridge portion) on the pressurizing plate 169, the pressurizing plate 169** can apply more consistent pressurizing force regardless of the part tolerance, assembly tolerance, and the like.

Figures 9A, 9B, 9C, 9D, 9E, 9F, 9G, 9H:
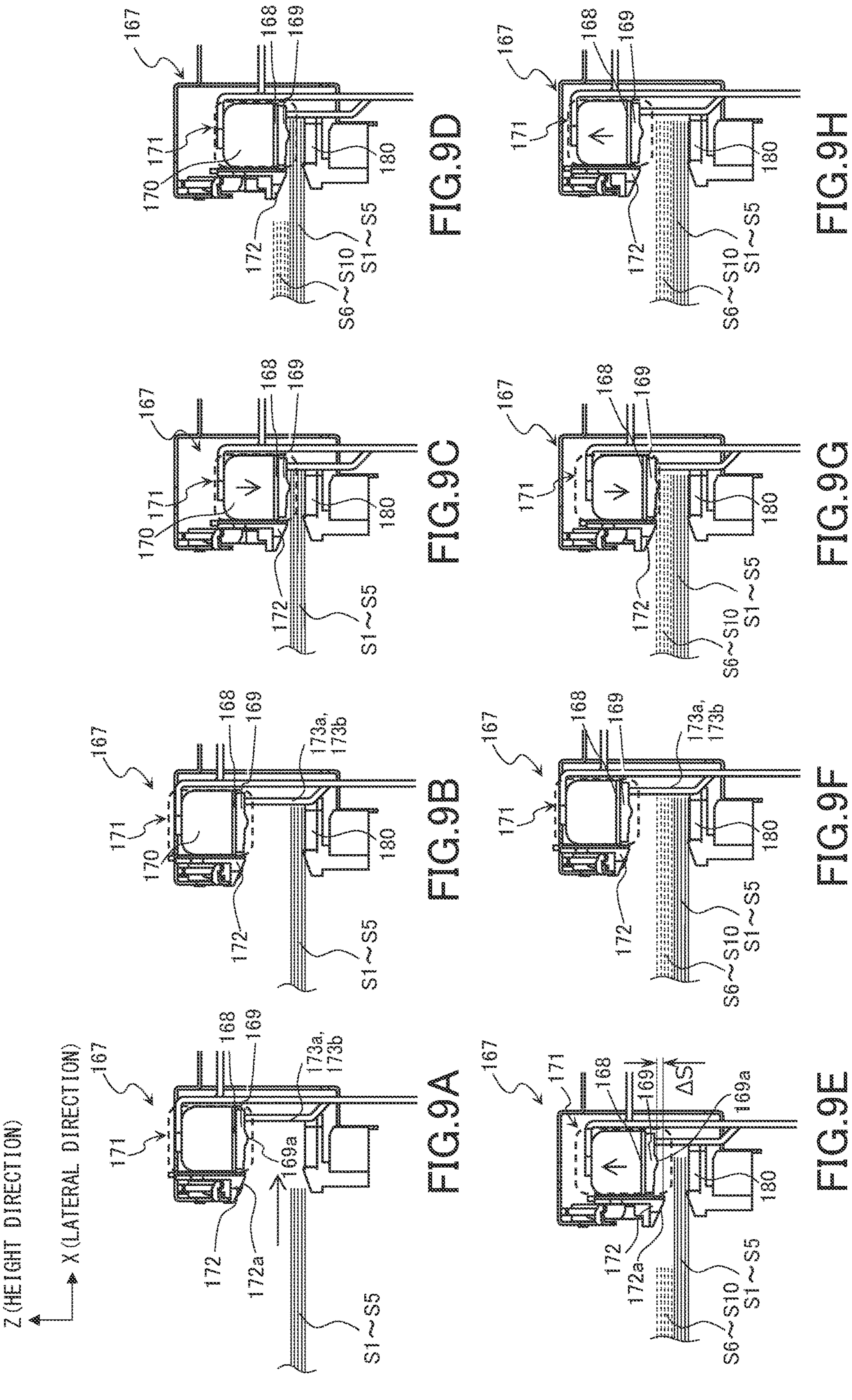
FIGS. 9A to 9H are diagrams illustrating an operation of the heat-and-press bonding portion according to the first embodiment.

As the heater 168 illustrated in FIG. 9A, a ceramic heater in which a pattern of a heat-generating resistor is formed on a ceramic substrate can be used. The heater 168 is disposed to be in contact with the back surface of the pressurizing plate 169 (surface of the pressurizing plate 169 on a side opposite to the sheet contact surface **169*a*). The pressurizing plate 169 and the heater 168 are held by the metal stay 170. The metal stay 170 is fastened to the lift plate 173. The lift plate 173 integrally moves with the heater portion 171. To be noted, in the present embodiment, the width alignment standard plates 173*a* and 173*b* described above are integrally formed with the lift plate 173 by bending part of a metal plate member constituting the lift plate 173. The width alignment standard plates 173*a* and 173*b* may be formed as members separate from the lift plate 173**.

The heater portion 171 is capable of, by the driving system 167D, moving to a pressurizing position (position during heat-and-press bonding illustrated in FIGS. 9C and 9F) where the pressurizing plate 169 pressurizes the sheet bundle, and a retracted position (standby position illustrated in FIG. 9A) in which the pressurizing plate 169 is retracted (separated) in the Z direction from the upper surface of the sheet bundle. The pressurizing position of the heater portion 171 can change in accordance with the thickness of the sheet bundle between the pressurizing plate 169 and the receiving plate 180. To be noted, the position of the pressurizing plate 169 in the case where the heater portion 171 is at the pressurizing position will be referred to as a pressurizing position of the pressurizing plate 169, and the position of the pressurizing plate 169 in the case where the heater portion 171 is at the retracted position will be referred to as a retracted position of the pressurizing plate 169.

In addition, a temperature detection element such as a thermistor is disposed in the heater portion 171 as a temperature detection portion that detects the temperature of the heater 168. A controller 106C of the sheet processing apparatus 106 illustrated in FIG. 17 is capable of controlling the surface temperature of the pressurizing plate 169 to a predetermined temperature suitable for heat-and-press bonding by controlling power supply to the heater 168 on the basis of a detection signal of the temperature detection element.

The gear train 178, the pinion gear 179, and the rack gear 175 of the driving system 167D are an example of a drive transmission mechanism that transmits the driving force to the heater portion 171 while converting the rotation of the motor 177 to a force in the movement direction (Z direction) of the heater portion 171.

The pinion gear 179 is coupled to the motor 177 via the gear train 178. The pinion gear 179 is engaged with the rack gear 175. The gear train 178, the pinion gear 179, and the rack gear 175 constitute a reduction mechanism for obtaining a pressurizing force required for the heat-and-press bonding of the sheets. To be noted, as the reduction mechanism, for example, a worm gear or a planetary gear mechanism may be used.

The rack gear 175 is guided by a guide shaft 174 having a columnar shape extending in the Z direction, and is capable of reciprocating in the Z direction. The guide shaft 174 is a guide member that guides the movement direction of the rack gear 175 and the heater portion 171. The guide shaft 174 is fixed to the frame body of the heat-and-press bonding portion 167. The rack gear 175 moves in the Z direction as a result of the driving force of the motor 177 being transmitted thereto via the gear train 178 and the pinion gear 179. The rack gear 175 is capable of relatively moving in the Z direction with respect to the heater portion 171.

The compression spring 181 is disposed between the rack gear 175 and a lower surface portion **173*c* of the lift plate 173. The compression spring 181 is an elastic member provided in a transmission path for force from the driving system 167D to the heater portion 171. An end portion of the compression spring 181 on the +Z side is supported by a lower surface of the rack gear 175, and an end portion of the compression spring 181 on the −Z side is supported by the lower surface portion 173*c* of the lift plate 173. By disposing the compression spring 181 around the guide shaft 174 guiding the rack gear 175 and the heater portion 171**, the layout of the apparatus can be made more compact.

In the case where the heat-and-press bonding portion 167 does not perform heat-and-press bonding of the sheet bundle, the rack gear 175 is caused to abut an upper surface portion **173*d* of the lift plate 173 by an urging force in the +Z direction received from the compression spring 181. In this case, the heater portion 171** is positioned at the retracted position.

In the case where the heat-and-press bonding portion 167 performs heat-and-press bonding of the sheets, the rack gear 175 moves in the pressurizing direction (−Z direction) by the driving force transmitted thereto from the motor 177. As a result of this, the heater portion 171 moves in the pressurizing direction (−Z direction), and the pressurizing plate 169 comes into contact with the upper surface of the sheet bundle. As a result of the rack gear 175 moving further in the pressurizing direction (−Z direction) after the pressurizing plate 169 has come into contact with the upper surface of the sheet bundle, the pressurizing plate 169 pressurizes the sheet bundle. When the heat-and-press bonding portion 167 performs heat-and-press bonding of the sheet bundle, the compression spring 181 is elastically deformed by the driving force of the motor 177, and the pressurizing plate 169 and the receiving plate 180 pressurize the sheet bundle by the restoration force (elastic force) of the compression spring 181.

The sheet separation member 172 illustrated in FIG. 9A has a sheet contact surface 172*a* serving as a distal end (end surface) on the −Z side. The sheet contact surface 172*a* is a surface (second contact surface) opposing the upper surface (first surface) of the sheet bundle.

The sheet separation member 172 is movable to a non-protruding position illustrated in FIG. 9A and a protruding position illustrated in FIG. 9E with respect to the heater portion 171. The protruding position is a position where the sheet contact surface 172*a* of the sheet separation member 172 protrudes to the −Z side (to a position closer to the receiving plate 180) more than the sheet contact surface 169*a* of the pressurizing plate 169. The non-protruding position is a position where the sheet contact surface 172*a* of the sheet separation member 172 protrudes to the +Z side (to a position farther from the receiving plate 180) to the same position as the sheet contact surface 169*a* of the pressurizing plate 169 or more than the sheet contact surface 169*a* of the pressurizing plate 169 in the Z direction. "The same position as the sheet contact surface 169*a*" includes a case where the sheet contact surface 172*a* of the sheet separation member 172 and the sheet contact surface 169*a* of the pressurizing plate 169 are substantially on the same plane due to the warpage of the members when pressurizing the sheet bundle.

Operation of Heat-and-Press Bonding Portion

The heat-and-press bonding operation of the heat-and-press bonding portion 167 will be described with reference to FIGS. 9A to 9H. FIGS. 9A to 9H are each a diagram illustrating the heat-and-press bonding portion 167 as viewed in the sheet conveyance direction (Y direction). In FIGS. 9A to 9H, the operation of the sheet separation member 172 in the heat-and-press bonding operation will be described, and the detailed configuration of the sheet separation member 172 will be described later with reference to FIG. 10.

To be noted, the heat-and-press bonding operation described below is controlled by the controller included in the sheet processing apparatus 106. This controller includes a central processing unit: CPU that executes a program, and a storage device such as a read-only memory: ROM that stores the program and data. The CPU controls the operation of each portion of the sheet processing apparatus 106 including the heat-and-press bonding portion 167 by reading out the program from the storage device and executing the program, and thus driving various actuators on the basis of information obtained in various sensors and information obtained from a controller of the printer body 101. The controller of the sheet processing apparatus 106 is communicably connected to the controller of the printer body 101. The controller of the sheet processing apparatus 106 receives information (whether bonding needs to be performed in the heat-and-press bonding portion 167, the number of sheets constituting one copy of product, the sheet size, the sheet conveyance timing, etc.) about the image forming operation that is being executed from the controller of the printer body 101. The controller of the printer body 101 and the controller of the sheet processing apparatus 106 are examples of control circuits that control the image forming apparatus 100 of the present embodiment.

When an image forming job (booklet making job) including a bonding process in the sheet processing apparatus 106 is input to the image forming apparatus 100, images are formed on the sheets S one sheet at a time by the printer body 101, and a bonding toner image 39 illustrated in FIG. 2 is formed in a bonding region on the sheet S. The sheet processing apparatus 106 receives the sheets S discharged one by one from the printer body 101, forms the sheet bundle in which a predetermined number of the sheets S per copy are stacked in the buffering portion 120, and receives the sheet bundle at the alignment portion 156. The sheet bundle is aligned (longitudinally aligned) in the Y direction one sheet at a time by the alignment operation of the alignment portion 156 described above, and is then collectively aligned (laterally aligned) in the X direction.

FIG. 9A illustrates the same state as FIG. 7C, that is, a state in which the longitudinal alignment of the sheets S1 to S5 in the sheet conveyance direction (Y direction) has been completed. In this state, the heater portion 171 is at a position (retracted position) away from the sheet in the Z direction.

FIG. 9B illustrates the same state as FIG. 7D, that is, a state in which the lateral alignment of the sheets S1 to S5 has been completed. The sheets S1 to S5 are aligned in the sheet width direction (X direction) by being caused to abut the width alignment standard plates 173*a* and 173*b*.

After the alignment of the sheets S1 to S5, the normal rotation of the motor 177 is started, and thus the movement of the heater portion 171 is started. FIG. 9C illustrates a state in which the heater portion 171 has started moving in the pressurizing direction (−Z direction), and the sheet contact surface 169*a* of the pressurizing plate 169 has come into contact with the uppermost sheet S5. In the state of FIG. 9C, the rack gear 175 illustrated in FIG. 8 is still abutting the upper surface portion 173*d* of the lift plate 173 by the urging force of the compression spring 181.

As a result of the normal rotation of the motor 177 being further continued from the state of FIG. 9C, the rack gear 175 relatively moves in the pressurizing direction (−Z direction) with respect to the heater portion 171. That is, while the pressurizing plate 169 receives a repulsive force in the +Z direction from the sheet bundle and thus the movement of the heater portion 171 in the pressurizing direction (−Z direction) is stopped, the rack gear 175 continues moving in the pressurizing direction (−Z direction). The compression spring 181 contracts by being pressed by the lower surface of the rack gear 175, and the restoration force of the compression spring 181 increases in accordance with the movement amount of the rack gear 175. This restoration force of the compression spring 181 is applied to the heater portion 171, and thus the pressurizing plate 169 and the receiving plate 180 pressurize the sheets S1 to S5.

FIG. 9D illustrates a state while the heat-and-press bonding of the sheets S1 to S5 is performed. The driving of the motor 177 is controlled such that a state in which the sheets S1 to S5 are pressurized by a preset pressurizing force is maintained for a predetermined time.

In the case of making one copy of booklet by further bonding additional sheets to the sheets S1 to S5, succeeding sheets are conveyed to the alignment portion 156. In the present embodiment, while the heat-and-press bonding operation on the preceding sheet bundle (S1 to S5) is performed in the heat-and-press bonding portion 167, the reception and alignment of a succeeding sheet bundle (S6 to S10) at the alignment portion 156 can be started. FIG. 9D illustrates the fact that the next sheets S6 to S10 can be received by the alignment portion 156 in parallel with the heat-and-press bonding of the sheets S1 to S5.

After the heat-and-press bonding of the sheets S1 to S5 is completed, the motor 177 is rotated in the reverse direction, and thus the heater portion 171 is moved from the pressurizing position to the retracted position. FIG. 9E illustrates a state in the middle of the movement of the heater portion 171 from the pressurizing position to the retracted position after the heat-and-press bonding on the sheets S1 to S5. FIG. 9F illustrates a state in which the heater portion 171 has reached the retracted position.

Here, in the process of the heater portion 171 moving from the pressurizing position to the retracted position, the sheet separation member 172 comes into contact with the upper surface of the sheets S1 to S5, and separates the sheets S1 to S5 from the pressurizing plate 169. As a result of the sheet separation member 172 separating the sheets S1 to S5 subjected to heat-and-press bonding from the pressurizing plate 169, a malfunction (such as a jam), damage to the sheets S1 to S5, and the like occurring as a result of the sheets S1 to S5 sticking to the pressurizing plate 169 can be made less likely to occur. For example, occurrence of jam can be reduced when performing the lateral alignment by causing the succeeding sheets S6 to S10 to abut the width alignment standard plates 173*a* and 173*b* after the heater portion 171 has returned to the retracted position.

Specifically, in the present embodiment, a configuration in which a height difference ΔS is generated between the sheet separation member 172 and the pressurizing plate 169 in a state in the middle of the movement of the heater portion 171 from the pressurizing position to the retracted position as illustrated in FIG. 9E is employed. That is, in the process of the heater portion 171 moving from the pressurizing position to the retracted position, the sheet separation member 172 moves from the non-protruding position to the protruding position. The height difference ΔS is a distance in the Z direction between the sheet contact surface 169*a* (first contact surface) and the sheet contact surface 172*a* (second contact surface) in the case where the sheet separation member 172 is positioned at the protruding position.

As described above, in the process of the pressurizing plate 169 moving from the pressurizing position to the retracted position, the distance between the sheet contact surfaces 172*a* and 169*a* in the Z direction is larger than the distance between the sheet contact surfaces 172*a* and 169*a* in the Z direction in the case where the pressurizing plate 169 is positioned at the retracted position. In other words, in the process of the pressurizing member moving from the pressurizing position to the retracted position, the distance between the first contact surface and the second contact surface in the pressurizing direction in which the sheet bundle is pressed by the pressurizing member is larger than the distance between the first contact surface and the second contact surface in the pressurizing direction in the case where the pressurizing member is positioned at the retracted position. As a result of this, the pressurizing plate 169 can be operated such that the sheets subjected to the heat-and-press bonding are separated from the pressurizing plate 169.

In addition, in the present embodiment, in the case where the bonding toner image 39 illustrated in FIG. 2 is formed on the upper surface of the sheet S5 to bond the sheets S1 to S5 to the succeeding sheets S6 to S10, the pressurizing plate 169 performs heat-and-press bonding of the sheets S1 to S5 while in direct contact with the bonding toner image 39. In other words, the sheet bonding apparatus (booklet making apparatus) of the present embodiment bonds a sheet bundle by pressurizing the sheet bundle by the pressurizing member in a state in which an adhesive is applied on the first surface of the sheet bundle (state in which an adhesive layer is formed on the first surface), and then bonds a succeeding sheet to the sheet bundle by pressurizing the succeeding sheet stacked on the sheet bundle by the pressurizing member.

In this case, when the pressurizing plate 169 is moved from the pressurizing position to the retracted position after the heat-and-press bonding of the sheets S1 to S5, the sheets S1 to S5 are likely to stick to the pressurizing plate 169 by the adhesive force of the heated toner. According to the present embodiment, since the sheet separation member 172 separates the sheets S1 to S5 subjected to heat-and-press bonding from the pressurizing plate 169, sticking of the sheets S1 to S5 can be made less likely to occur even in the case where the pressurizing plate 169 comes into direct contact with the bonding toner image 39.

To be noted, even in the case where the bonding toner image 39 is not formed on the upper surface of the sheet S5, sticking can occur depending on the material of the sheet S5, heating temperature of the heat-and-press bonding, settings of the pressurizing force, and the like. Therefore, the configuration of the present embodiment can also reduce the possibility of occurrence of sticking of the sheets caused by a factor other than the adhesive force of the heated toner.

As illustrated in FIG. 9F, in the present embodiment, the height difference ΔS between the sheet separation member 172 and the pressurizing plate 169 can be eliminated before the heater portion 171 returns to the retracted position. That is, after the sheet separation member 172 has moved from the non-protruding position to the protruding position in the process of the pressurizing plate 169 moving from the pressurizing position to the retracted position, the sheet separation member 172 moves from the protruding position to the non-protruding position before the pressurizing plate 169 reaches the retracted position. As a result of the height difference ΔS being eliminated before the heater portion 171 returns to the retracted position, the lateral alignment of the succeeding sheets S6 to S10 can be started quicker than a configuration in which the height difference ΔS is eliminated after the heater portion 171 has returned to the retracted position.

In addition, since the sheet separation member 172 moves to the non-protruding position before the pressurizing plate 169 reaches the retracted position, a large opening for the width alignment member 155 (alignment member) to cause the succeeding sheet to abut the width alignment standard plates 173*a* and 173*b* (sheet abutting portions) and thus align the succeeding sheet can be secured. That is, a situation in which the maximum stacking height (hereinafter referred to as a receiving opening of the heat-and-press bonding portion 167) of the sheet bundle that can be received to the bonding space between the pressurizing plate 169 and the receiving plate 180 is reduced by the sheet separation member 172 can be avoided.

As a comparative example, in a configuration in which the receiving opening of the heat-and-press bonding portion 167 is narrowed by the sheet separation member 172, the maximum number of sheets that can be bonded by the heat-and-press bonding portion 167 becomes small. If the stroke (movement amount from the pressurizing position to the retracted position) of the heater portion 171 is increased to increase the maximum number of sheets that can be bonded, the size and energy consumption (environmental load) of the apparatus increase. In contrast, in the present embodiment, the height difference ΔS is not present in a state in which the heater portion 171 is positioned at the retracted position, and therefore the receiving opening of the heat-and-press bonding portion 167 is not narrowed by the sheet separation member 172. Therefore, the sticking of the sheets to the pressurizing plate 169 can be suppressed while avoiding increase in the size of the apparatus.

To be noted, the sheet contact surface 172*a* of the sheet separation member 172 of the present embodiment is inclined in the pressurizing direction (−Z direction) toward the downstream side in the direction (+X direction) in which the width alignment member 155 moves the sheet toward the width alignment standard plates 173*a* and 173*b* as illustrated in FIG. 9A. As a result of this, when the width alignment member 155 aligns the sheet, a possibility of occurrence of a jam caused as a result of an end portion of the sheet getting caught by the sheet separation member 172 can be further lowered.

FIG. 9F illustrates a state in which the heater portion 171 has returned to the retracted position after the heat-and-press bonding of the sheets S1 to S5 and the succeeding sheets S6 to S10 have been caused to abut the width alignment standard plates 173*a* and 173*b* (state in which the lateral alignment has been completed).

The operation of during heat-and-press bonding of the sheets S6 to S10 is substantially the same as the operation during heat-and-press bonding of the sheets S1 to S5. That is, after the alignment of the sheets S6 to S10, the normal rotation of the motor 177 is started, and thus the movement of the heater portion 171 is started. As a result of the normal rotation of the motor 177 being further continued after the heater portion 171 has come into contact with the upper surface of the sheet S10, the compression spring 181 deforms, and the pressurizing plate 169 and the receiving plate 180 pressurize the sheets S6 to S10 by the restoration force of the compression spring 181.

FIG. 9G illustrates a state in which the sheets S1 to S10 are nipped between the pressurizing plate 169 and the receiving plate 180 and the heat-and-press bonding of the sheets S6 to S10 is being performed. Here, as a result of the bonding toner image 39 illustrated in FIG. 2 being formed on at least one of the upper surface of the sheet S5 and the lower surface of the sheet S6, the sheet bundle constituted by the sheets S1 to S5 and the sheet bundle constituted by the sheets S6 to S10 are bonded to each other.

After the heat-and-press bonding of the sheets S6 to S10 is completed, the motor 177 is rotated in the reverse direction, and thus the heater portion 171 is moved from the pressurizing position to the retracted position. FIG. 9H illustrates a state in the middle of movement of the heater portion 171 from the pressurizing position to the retracted position after the heat-and-press bonding of the sheets S6 to S10.

Here, the sheet bundle constituted by the ten sheets S1 to S10 is heavier than the sheet bundle constituted by the five sheets S1 to S5 illustrated in FIG. 9E. Therefore, when the heater portion 171 retracts from the sheet bundle constituted after the second heat-and-press bonding as illustrated in FIG. 9H, the sheet bundle is more likely to be separated from the pressurizing plate 169 by the own weight thereof than when the heater portion 171 retracts from the sheet bundle after the first heat-and-press bonding as illustrated in FIG. 9E. That is, the sticking of the sheets to the pressurizing plate 169 is less likely to occur as the number of sheets in the sheet bundle after the heat-and-press bonding increases.

In the present embodiment, a configuration in which the height difference ΔS between the sheet separation member 172 and the pressurizing plate 169 is not generated in the process of the heater portion 171 moving from the pressurizing position to the retracted position in the case where the thickness of the sheet bundle nipped between the pressurizing plate 169 and the receiving plate 180 increases is employed. That is, while the heater portion 171 moves from the pressurizing position to the retracted position, the sheet separation member 172 is held at the non-protruding position. In other words, in the case where the pressurizing member moves from the pressurizing position to the retracted position after the pressurizing member has pressurized a sheet bundle of a first thickness, the sheet separation member moves from the first position to the second position. In addition, in the case where the pressurizing member moves from the pressurizing position to the retracted position after the pressurizing member has pressurized a sheet bundle of a second thickness larger than the first thickness, the sheet separation member does not move from the first position to the second position.

For the reason described above, in the case where the thickness of the sheet bundle is large, since the sticking of the sheets is less likely to occur, the sticking of the sheets can be suppressed even when the sheet separation member 172 is held at the non-protruding position. To be noted, the sheet separation member 172 may be configured to move from the non-protruding position to the protruding position in the process of the heater portion 171 moving from the pressurizing position to the retracted position.

As described above, the heat-and-press bonding portion 167 performs the heat-and-press bonding operation once each time a predetermined number of sheets are aligned by the alignment portion 156, and thus a booklet formed from sheets of a number larger than the predetermined number can be created. After the heat-and-press bonding is completed for all the sheets constituting one booklet is completed, the created booklet (sheet bundle) is discharged by a bundle discharge operation that will be described later.

To be noted, although an example in which a booklet constituted by ten sheets S1 to S10 is created has been described as an example herein, a booklet constituted by tens or more of sheets can be also created. In addition, although a sequence in which the heat-and-press bonding operation is performed for each predetermined number of sheets has been described, the number of sheets subjected to heat-and-press bonding in one heat-and-press bonding operation may be changed within one booklet. For example, the heat-and-press bonding operation can be performed by first performing heat-and-press bonding on two sheets and then performing heat-and-press bonding on each sheet one sheet at a time.

Bundle Discharge Operation

After the heat-and-press bonding is completed for all sheets constituting one booklet, the booklet is pushed out from the alignment portion 156 and the heat-and-press bonding portion 167 by the longitudinal alignment standard plate 154 illustrated in FIG. 5, and is conveyed in a direction (−Y direction) toward a bundle discharge roller pair 136 illustrated in FIG. 1 in the sheet conveyance direction. In other words, the longitudinal alignment standard plate 154 is an example of a push-out member that pushes out the sheet bundle from the alignment portion 156 and the heat-and-press bonding portion 167. To be noted, a push-out member that pushes out the processed sheet bundle may be provided in addition to the longitudinal alignment standard plate 154 serving as a standard for aligning the sheet bundle.

The bundle discharge roller pair 136 is a roller pair capable of opening and closing (coming into and out of contact), and receives the booklet from a conveyance path 138 in a separated state. After the leading end of the booklet in the direction in which the longitudinal alignment standard plate 154 pushes out the booklet has passed the position of the bundle discharge roller pair 136, the movement of the longitudinal alignment standard plate 154 is stopped, and the bundle discharge roller pair 136 is switched to the contact state. As a result of this, the bundle discharge roller pair 136 nips and conveys the booklet, and discharges the booklet onto the lower discharge tray 137. Meanwhile, the longitudinal alignment standard plate 154 returns to the standby position after passing the booklet onto the bundle discharge roller pair 136. The bundle discharge roller pair 136 is an example of a discharge portion that discharges the bonded sheet bundle, and may have, for example, a configuration in which the longitudinal alignment standard plate 154 discharges the sheet bundle to the outside of the sheet processing apparatus 106 as it is.

Movement Mechanism of Sheet Separation Portion

Figure 10A:
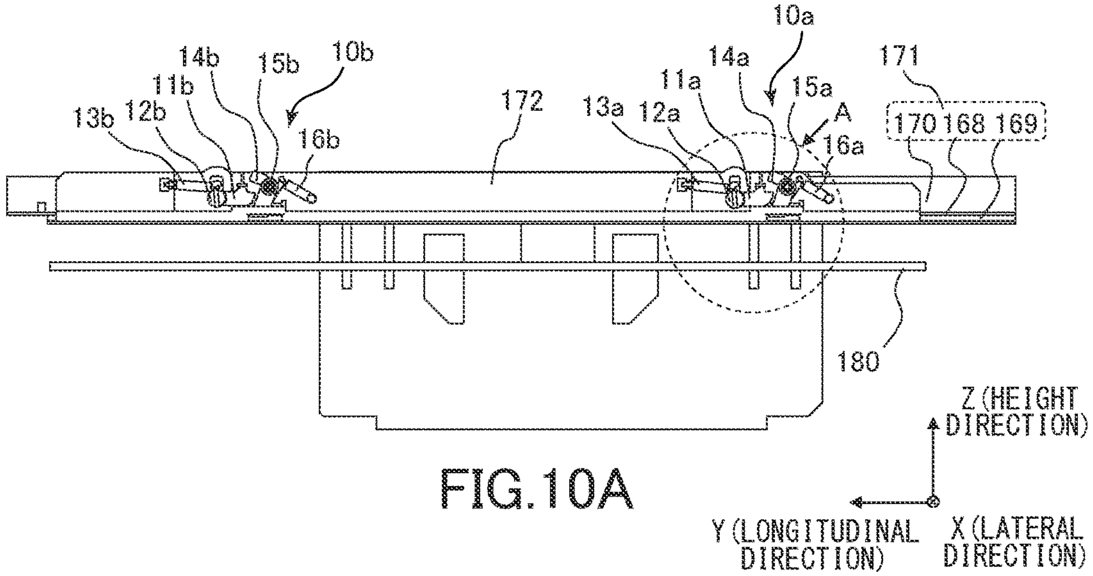
FIGS. 10A to 10E are diagrams for describing a movement mechanism of a sheet separation member according to the first embodiment.

Movement mechanisms 10*a* and 10*b* provided in the heat-and-press bonding portion 167 will be described with reference to FIGS. 10A to 10E. FIG. 10A is a diagram illustrating the heat-and-press bonding portion 167 as viewed from the +X side. FIGS. 10B to 10E are each an enlarged view of a region circled by a broken line in FIG. 10A. To be noted, in FIGS. 10A to 10E, illustration of the support members 801 and 802 illustrated in FIG. 8 will be omitted.

As illustrated in FIG. 10A, the heat-and-press bonding portion 167 of the present embodiment includes two movement mechanisms 10*a* and 10*b*. The movement mechanism 10*a* is provided at a position away from the movement mechanism 10*b* in the Y direction. The movement mechanisms 10*a* and 10*b* relatively move the sheet separation member 172 with respect to the pressurizing plate 169 in an interlocked manner with the movement of the pressurizing plate 169 from the pressurizing position to the retracted position. The sheet separation member 172 is capable of relatively moving with respect to the pressurizing plate 169 by the two movement mechanisms 10*a* and 10*b* while maintaining a posture substantially parallel to the pressurizing plate 169.

The movement mechanism 10*a* includes a first lever 11*a*, a stepped screw 12*a*, a first tension spring 13*a*, a second lever 14*a*, a fixed shaft 15*a*, and a second tension spring 16*a*. The movement mechanism 10*b* includes a first lever 11*b*, a stepped screw 12*b*, a first tension spring 13*b*, a second lever 14*b*, a fixed shaft 15*b*, and a second tension spring 16*b*.

The two movement mechanisms 10*a* and 10*b* substantially have the same configuration. Therefore, the configuration of the movement mechanism 10*a* will be described below.

In the movement mechanism 10*a*, the stepped screw 12*a* is a member that is supported by the heater portion 171 and moves together with the heater portion 171. The fixed shaft 15*a* is a member that is supported by the frame body of the heat-and-press bonding portion 167 and does not move together with the heater portion 171. The first lever 11*a* rotates about the stepped screw 12*a*. The second lever 14*a* rotates about the fixed shaft 15*a*. The first tension spring 13*a* urges the first lever 11*a* in a predetermined rotational direction. The second tension spring 16*a* urges the second lever 14*a* in a predetermined rotational direction.

The stepped screw 12*a* and the first lever 11*a* are an example of a coupling portion coupling the sheet separation member 172 and the pressurizing plate 169 together so as to allow the relative movement of the sheet separation member 172 and the pressurizing plate 169. The first tension spring 13*a* is an example of an urging member that urges the sheet separation member 172 in a direction (+Z direction) opposite to the pressurizing direction with respect to the pressurizing plate 169. The second lever 14*a* is an example of an abutting member that is supported by the frame body of the heat-and-press bonding portion 167, abuts the coupling portion in the process of the pressurizing plate 169 moving from the pressurizing position to the retracted position, and moves the sheet separation member 172 in the pressurizing direction (−Z direction) with respect to the pressurizing plate 169.

Figure 10B:
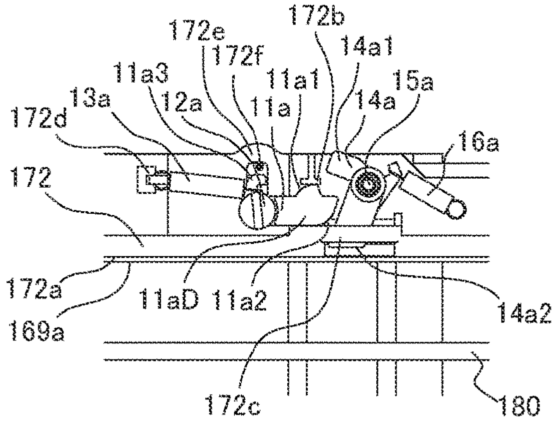

Each member will be described in detail below. As illustrated in FIG. 10B, the screw portion of the stepped screw 12*a* is fastened to a screw hole provided in the metal stay 170 of the heater portion 171. The cylindrical portion (shaft portion or first shaft portion) of the stepped screw 12*a* penetrates an elongated hole 172*f* provided in the sheet separation member 172. The elongated hole 172*f* extends along the pressurizing direction (Z direction) of the heat-and-press bonding. The short-side dimension of the elongated hole 172*f* and the outer diameter of the cylindrical portion of the stepped screw 12*a* are approximately equal. As a result of the stepped screw 12*a* fixed to the heater portion 171 moving inside the elongated hole 172*f* of the sheet separation member 172, relative movement in the Z direction of the sheet separation member 172 with respect to the heater portion 171 is allowed. To be noted, the short-side dimension of the elongated hole 172*f* in the other movement mechanism 10*b* is larger than the outer diameter of the cylindrical portion of the stepped screw 12*b*, and a play is provided to suppress interference during assembly.

The first lever 11*a* is supported by the cylindrical portion of the stepped screw 12*a*, and is rotatable about the axis extending in the X direction. The rotational axis of the first lever 11*a* relatively moves in the Z direction with respect to the sheet separation member 172 together with the stepped screw 12*a*.

Abutting surfaces 11*a*1 and 11*a*2 serving as engagement portions with the sheet separation member 172 are provided at a distal end portion 11*a*D (far end with respect to the stepped screw 12*a*) of the first lever 11*a*. A surface 172*b* of the sheet separation member 172 abuts the abutting surface 11*a*1 from the +Z side. A surface 172*c* of the sheet separation member 172 abuts the abutting surface 11*a*2 from the −Z side. The abutting surfaces 11*a*1 and 11*a*2 are concentrically formed (along arcs of virtual circles having the same center 11*a*4) as viewed in the X direction. Therefore, the relative position of the distal end portion 11*a*D in the Z direction (position of the center common to the abutting surfaces 11*a*1 and 11*a*2) with respect to the sheet separation member 172 does not change even when the angle of the first lever 11*a* changes. That is, the distal end portion 11*a*D of the first lever 11*a* is positioned with respect to the sheet separation member 172 in the Z direction.

The first tension spring 13*a* urges the first lever 11*a* in the counterclockwise direction (first rotational direction) in the drawing. The urging direction of the first tension spring 13*a* is a direction in which the sheet separation member 172 is urged in the +Z direction via the first lever 11*a*. The first lever 11*a* stops rotating when the first lever 11*a* has rotated in accordance with the urging force of the first tension spring 13*a* to a position where the stepped screw 12*a* abuts an end in the −Z direction of a peripheral edge 172*e* of the elongated hole 172*f*. This stopping position corresponds to the non-protruding position of the sheet separation member 172. That is, the first tension spring 13*a* urges the sheet separation member 172 via the first lever 11*a* so as to hold the sheet separation member 172 at the non-protruding position with respect to the heater portion 171. In addition, in the case where the first lever 11*a* rotates in the clockwise direction (second rotational direction) in the drawing that is a direction against the urging force of the first tension spring 13*a*, the sheet separation member 172 moves in the pressurizing direction (−Z direction) with respect to the heater portion 171.

The fixed shaft 15*a* (second shaft portion) is swagged to the above-described support member 801 illustrated in FIG. 8, and is thus fixed (positioned) with respect to the frame body of the heat-and-press bonding portion 167. The second lever 14*a* is supported by the fixed shaft 15*a*, and rotates about the fixed shaft 15*a*. The second tension spring 16*a* is coupled to a hook portion provided on the support member 801 and to a hook portion of the second lever 14*a*. The second lever 14*a* is urged in the clockwise direction in the drawing by the urging force of the second tension spring 16*a*.

Figure 10C:
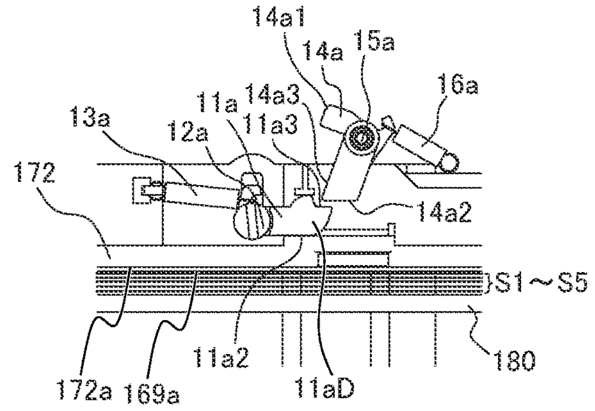
Figure 10D:
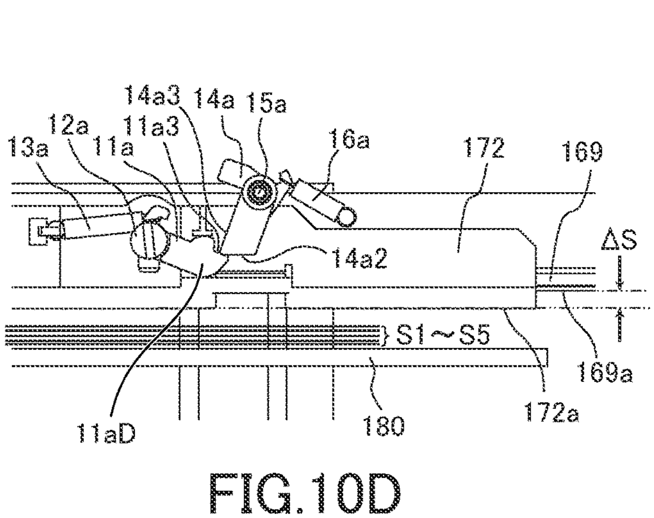

In addition, the first lever 11*a* has an abutting surface 11*a*3 illustrated in FIG. 10D that abuts an abutting surface 14*a*2 provided on the second lever 14*a*. When the abutting surface 14*a*2 of the second lever 14*a* abuts the abutting surface 11*a*3 of the first lever 11*a*, the movement of the distal end portion 11*a*D of the first lever 11*a* is restricted. That is, the second lever 14*a* supported by the fixed shaft 15*a* is capable of rotating the first lever 11*a* in the clockwise direction in the drawing (second rotational direction) against the urging force of the first tension spring 13*a*.

Operation of Movement Mechanism

The operation of the movement mechanism 10*a* and the movement of the sheet separation member 172 during heat-and-press bonding operation will be described. To be noted, although only the one movement mechanism 10*a* will be described below, substantially the same operation is performed by the other movement mechanism 10*b*.

FIGS. 10A and 10B illustrate a state in which the heat-and-press bonding operation is started (state in which the heater portion 171 is held at the retracted position, corresponding to FIG. 9A). In this case, the abutting surface 14*a*2 of the second lever 14*a* is not abutting the abutting surface 11*a*3 of the first lever 11*a*, and the sheet separation member 172 is held at the non-protruding position by the urging force of the first tension spring 13*a*. That is, in the present embodiment, in the case where the pressurizing member is positioned at the retracted position, the sheet separation member is positioned at the first position. In addition, the second lever 14*a* is held at a position where the abutting surface 14*a*2 is approximately horizontal (approximately parallel to the X-Y plane) as a result of an abutting portion 14*a*1 abutting part of the support member 801 illustrated in FIG. 8.

FIG. 10C illustrates a state (corresponding to FIG. 9D) in which the heater portion 171 has been moved from the retracted position to the pressurizing position and the heat-and-press bonding of the sheets S1 to S5 is performed. While the heater portion 171 moves from the retracted position to the pressurizing position, the sheet separation member 172 moves in the pressurizing direction (−Z direction) together with the heater portion 171 in the state of being held at the non-protruding position by the urging force of the first tension spring 13*a*.

To be noted, in the process of moving the heater portion 171 from the retracted position to the pressurizing position, the abutting surface 11*a*2 of the first lever 11*a* abuts the abutting surface 14*a*3 of the second lever 14*a*, and rotates the second lever 14*a* in the counterclockwise direction in the drawing against the urging force of the second tension spring 16*a* of the second lever 14*a*. As a result of this, the first lever 11*a* is allowed to move in the pressurizing direction (−Z direction) beyond the second lever 14*a*. After the first lever 11*a* has passed, the second lever 14*a* returns to the original position (position where the abutting surface 14*a*2 is approximately horizontal) by the urging force of the second tension spring 16*a*.

FIG. 10D illustrates a state in the middle of the movement of the heater portion 171 from the pressurizing position to the retracted position (corresponding to FIG. 9E). When the heater portion 171 starts moving from the pressurizing position in the retracting direction (+Z direction) the abutting surface 11*a*3 of the first lever 11*a* abuts the abutting surface 14*a*2 of the second lever 14*a*, and receives force in the pressurizing direction (−Z direction). Further, since movement in the retracting direction (+Z direction) of the distal end portion 11*a*D of the first lever 11*a* positioned with respect to the sheet separation member 172 is restricted, movement of the sheet separation member 172 in the retracting direction (+Z direction) is restricted. As a result of the movement of the sheet separation member 172 being delayed with respect to the movement of the heater portion 171, the height difference ΔS between the sheet separation member 172 and the pressurizing plate 169 is generated. In other words, as a result of the movement of the sheet separation member 172 being delayed with respect to the movement of the heater portion 171, the sheet separation member 172 moves to the protruding position protruding in the pressurizing direction (−Z direction) with respect to the pressurizing plate 169. As a result of this, sticking of the sheets to the pressurizing plate 169 can be suppressed.

To be noted, the maximum value of the height difference ΔS in the process of the heater portion 171 moving from the pressurizing position to the retracted position is larger than the distance in the Z direction between the sheet contact surfaces 172*a* and 169*a* of the sheet separation member 172 and the pressurizing plate 169 when the heater portion 171 is positioned at the retracted position (FIG. 10B). As described above, the relative distance between the sheet contact surface 172*a* of the sheet separation member 172 and the sheet contact surface 169*a* of the pressurizing plate 169 changing in the process of the heater portion 171 moving from the pressurizing position to the retracted position, sticking of the sheets to the pressurizing plate 169 can be suppressed.

In addition, in the present embodiment, the maximum value of the relative distance (maximum value of the height difference ΔS) in the Z direction between the sheet contact surface 172*a* of the sheet separation member 172 and the sheet contact surface 169*a* of the pressurizing plate 169 in the case where the heater portion 171 moves from the pressurizing position to the retracted position is larger than the maximum value of the relative distance in the Z direction between the sheet contact surface 172*a* of the sheet separation member 172 and the sheet contact surface 169*a* of the pressurizing plate 169 in the case where the heater portion 171 moves form the retracted position to the pressurizing position. In other words, the maximum value of the distance between the first contact surface and the second contact surface in the pressurizing direction of the sheet bundle by the pressurizing direction in the case where the pressurizing member moves from the pressurizing position to the retracted position is larger than the maximum value of the distance between the first contact surface and the second contact surface in the pressurizing direction in the case where the pressurizing member moves from the retracted position to the pressurizing position. According to this configuration, sticking of the sheets to the pressurizing plate 169 can be suppressed.

When the heater portion 171 further moves in the retracting direction (+Z direction) from the state of FIG. 10D, the stepped screw 12*a* moves together with the heater portion 171, and thus the first lever 11*a* rotates in the clockwise direction in the drawing. Then, before the heater portion 171 reaches the retracted position, the abutting surface 11*a*3 of the first lever 11*a* is separated from the abutting surface 14*a*2 of the second lever 14*a*. As a result of this, the first lever 11*a* rotates in the counterclockwise direction in the drawing to a position of FIG. 10B in accordance with the urging force of the first tension spring 13*a*. That is, the sheet separation member 172 returns from the protruding position to the non-protruding position by the urging force of the first tension spring 13*a*.

Figure 10E:
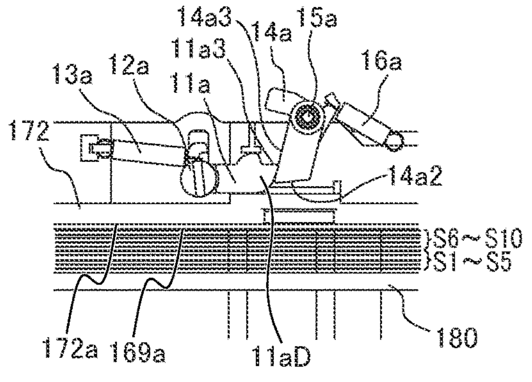

FIG. 10E illustrates a state (corresponding to FIG. 9G) in which the heater portion 171 has been moved again from the retracted position to the pressurizing position and the heat-and-press bonding of the sheets S6 to S10 is performed. Unlike at the time of the first heat-and-press bonding illustrated in FIG. 10C, as a result of increase in the thickness of the sheet bundle between the pressurizing plate 169 and the receiving plate 180, the pressurizing position has changed to a higher position (in the +Z direction). Therefore, also in the state of FIG. 10E in which the heater portion 171 has moved to the pressurizing position, the first lever 11*a* has not passed the second lever 14*a*, and the abutting surface 11*a*3 of the first lever 11*a* does not face the abutting surface 14*a*2 of the second lever 14*a*.

Therefore, in the process of moving the heater portion 171 from the state of FIG. 10E to the retracted position, the height difference ΔS between the sheet separation member 172 and the pressurizing plate 169 is not generated. In other words, in the case where the thickness of the sheet bundle is large, the heater portion 171 moves from the pressurizing position to the retracted position while the sheet separation member 172 is held at the non-protruding position as illustrated in FIG. 9H.

As described above, in the case where the thickness of the sheet bundle increases, the weight of the sheet bundle also increases, and therefore sticking of the sheets to the pressurizing plate 169 becomes less likely to occur. Therefore, even if the height difference ΔS is not generated in the case where the heater portion 171 is moved to the retracted position from the state of FIG. 10E, the possibility of occurrence of the sticking of the sheets is low. Therefore, the sticking of the sheets can be effectively suppressed by the movement mechanisms 10*a* and 10*b* that have a simple configuration and that operate to generate the height difference ΔS only in the case where the movement distance from the retracted position to the pressurizing position is equal to or larger than a predetermined distance. The "predetermined distance" described above is a movement distance to a position where the abutting surface 11*a*3 of the first lever 11*a* and the abutting surface 14*a*2 of the second lever 14*a* start opposing each other in the case where the heater portion 171 is gradually moved from the pressurizing position to the retracted position.

To be noted, although a case where the height difference ΔS is eliminated in the state in which the ten sheets S1 to S10 are stacked has been described as an example for describing the operation of the movement mechanisms 10*a* and 10*b*, the thickness of the sheet bundle at which the height difference ΔS is eliminated can be changed. The thickness of the sheet bundle at which the height difference ΔS is eliminated is preferably set in accordance with the specifications (for example, an expected sheet thickness (grammage), adherence of the toner, size of the bonding region, and the like) of the image forming apparatus 100 such that sticking of the sheets can be sufficiently suppressed.

As described above, according to the present embodiment, a sheet bonding apparatus (booklet making apparatus) and an image forming apparatus capable of suppressing occurrence of sticking of the sheets can be provided.

Modification Examples

In the first embodiment, an example in which the second lever 14*a* (abutting member) of the movement mechanism 10*a* abuts the first lever 11*a* (part of the coupling portion), and thus the sheet separation member 172 is relatively moved with respect to the pressurizing plate 169 has been described. The configuration is not limited to this. For example, the sheet separation member 172 may be relatively moved with respect to the pressurizing plate 169 by causing the second lever 14*a* to abut part (abutted portion) of the sheet separation member 172 in the process of the pressurizing plate 169 moving from the pressurizing position to the retracted position. In this case, an operation similar to the first embodiment can be realized if the shapes of the abutted portion and the second lever 14*a* are set such that the second lever 14*a* is separated from the abutted portion of the sheet separation member 172 before the pressurizing plate 169 reaches the retracted position.

The configuration is not limited to those described above, and the specific configuration of the movement mechanisms 10*a* and 10*b* can be modified as appropriate. For example, as the coupling portion, a configuration obtained by omitting the first lever 11*a* from a configuration of the first embodiment in which the stepped screw 12*a* (first shaft portion) and the first lever 11*a* are combined may be employed. In this case, the first tension spring 13*a* is coupled to the heater portion 171 and the sheet separation member 172 to urge the sheet separation member 172 in the retracting direction (+Z direction). In addition, the second lever 14*a* abuts part of the sheet separation member 172 in the process of the pressurizing plate 169 moving from the pressurizing position to the retracted position, and moves the sheet separation member 172 in the pressurizing direction (−Z direction) with respect to the pressurizing plate 169 against the urging force of the first tension spring 13*a*. An operation similar to the first embodiment can be also realized according to a configuration like this.

In addition, in the first embodiment, the non-protruding position of the sheet separation member 172 is set to a position where the sheet contact surface 172*a* of the sheet separation member 172 is at the same position as or is more on the +Z side (position farther from the receiving plate 180) than the sheet contact surface 169*a* of the pressurizing plate 169 in the Z direction. The configuration is not limited to this, and the position of the sheet separation member 172 in the case where the heater portion 171 is positioned at the retracted position may be a position where the sheet contact surface 172*a* of the sheet separation member 172 is more on the −Z side (position closer to the receiving plate 180) than the sheet contact surface 169*a* of the pressurizing plate 169. In this case, the sheets having been subjected to heat-and-press bonding can be separated from the pressurizing plate 169 if the sheet separation member 172 is configured to further protrude in the −Z direction in the process of the heater portion 171 moving from the pressurizing position to the retracted position.

Second Embodiment

A sheet bonding apparatus (booklet making apparatus) and an image forming apparatus according to a second embodiment will be described. In the second embodiment, a configuration example in which the sheet separation member can be moved independently from the pressurizing plate unlike the first embodiment in which the sheet separation member 172 relatively moves with respect to the pressurizing plate 169 in an interlocked manner with movement of the pressurizing plate 169 will be described.

Figure 11A:
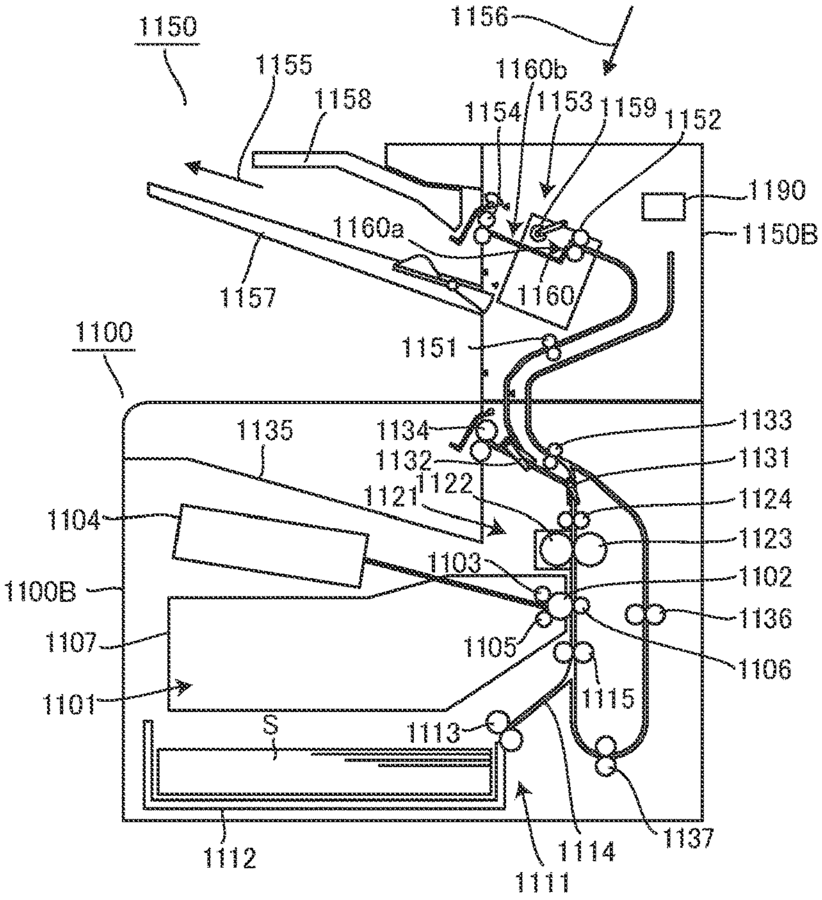
FIG. 11A is a schematic view of an image forming apparatus according to a second embodiment.

The outline of an image forming apparatus 1100 according to the second embodiment will be described with reference to FIG. 11A. The image forming apparatus 1100 includes a printer body 1100A serving as an image forming apparatus body having an image forming function (printing function), and a sheet processing apparatus 1150 having a sheet bonding function. That is, the image forming apparatus 1100 can be referred to as an image forming system constituted by the printer body 1100A that functions as an image forming apparatus by itself, and the sheet processing apparatus 1150.

The image forming apparatus 1100 of the present embodiment can make a booklet by performing printing and bookbinding in one apparatus by forming an image on sheets S one by one by the printer body 1100A and performing heat-and-press bonding on a stack of a plurality of sheets S in the sheet processing apparatus 1150. As the sheet S, a wide variety of sheet materials of different sizes and materials can be used. Examples of the sheet materials include paper sheets such as plain paper sheets and cardboards, surface-treated sheet materials such as coated paper sheets, plastic films, cloths, and sheet materials of irregular shapes such as envelopes and index paper sheets.

Printer Body

The printer body 1100A executes an image forming operation of forming images (toner images or developer images) on sheets S by using toner while conveying the sheets S serving as recording media one by one and discharging the sheets S to the sheet processing apparatus 1150. The printer body 1100A includes an image forming portion 1101 accommodated in a casing 1100B as an image forming portion. The image forming portion 1101 is an electrophotographic unit of a direct transfer system. The image forming portion 1101 includes a photosensitive drum 1102 serving as an image bearing member, a charging unit 1103 serving as a charging portion, an exposing unit 1104 serving as an exposing portion, a developing roller 1105 serving as a developing portion (developing member), a transfer roller 1106 serving as a transfer member, and a toner container 1107. The photosensitive drum 1102 is a photosensitive member formed in a drum shape.

The toner container 1107 accommodates black toner serving as a developer and as a powder adhesive. That is, the toner of the present embodiment is a developer for recording an image on the sheet S, and a powder adhesive for bonding sheets together by the bonding process (heat-and-press bonding) in the sheet processing apparatus 1150.

When start of the image forming operation is requested to the printer body 1100A, the photosensitive drum 1102 of the image forming portion 1101 is rotationally driven. The surface of the photosensitive drum 1102 is uniformly charged by the charging unit 1103, and is then exposed by the exposing unit 1104. The exposing unit 1104 exposes the photosensitive drum 1102 on the basis of image information input from an external information processing apparatus, and thus forms an electrostatic latent image on the surface of the photosensitive drum 1102. The developing roller 1105 supplies toner to the photosensitive drum 1102, and visualizes the electrostatic latent image as a toner image. As will be described later, in the present embodiment, a toner image for recording an image on the sheet S and a toner image for bonding sheets together are simultaneously formed.

In addition, the printer body 1100A includes a sheet feeding portion 1111 that feeds the sheet S, and a fixing portion 1121 that fixes the toner images to the sheet S. The sheet feeding portion 1111 includes a feeding cassette 1112 serving as an accommodating portion that accommodates the sheet S, and a feeding roller 1113 serving as a feeding portion. The fixing portion 1121 is a fixing unit of a thermal fixation system that fixes a toner image to the sheet S by heating and pressurizing the toner image. The fixing portion 1121 includes, for example, a fixing roller 1122 serving as a fixing member, a pressurizing roller 1123 serving as a pressurizing member that comes into pressure contact with the fixing member, and a heating portion that heats the fixing member. As the heating portion, a halogen lamp that emits radiant heat, a heater board including a heat generating resistor, an induction heating mechanism that causes a conductive layer in the fixing roller 1122 to generate heat, or the like can be used.

The sheet feeding portion 1111 feeds the sheets S accommodated in the feeding cassette 1112 one by one toward the image forming portion 1101. The sheet S fed from the sheet feeding portion 1111 passes a guide portion 1114, is subjected to skew correction by a registration roller pair 1115, and is then delivered into a transfer portion that is a nip portion between the photosensitive drum 1102 and the transfer roller 1106. In the transfer nip portion, the toner image is transferred from the photosensitive drum 1102 onto the sheet S. The sheet S having passed the transfer portion is heated and pressurized while being nipped and conveyed between the fixing roller 1122 and the pressurizing roller 1123 of the fixing portion 1121. As a result of this, the toner melts, and thus an image fixed to the sheet S can be obtained.

The sheet S having passed the fixing portion 1121 is conveyed by a conveyance roller pair 1124, and is guided to a selected conveyance path selected by a first switching guide 1131. In the case of duplex printing in which an image is formed on each surface of the sheet S, the sheet S on a first surface of which an image has been formed is guided to a reverse conveyance roller pair 1133 by the first switching guide 1131. Then, the sheet S is switched back by the reverse conveyance roller pair 1133 and is then conveyed to the image forming portion 1101 again via duplex conveyance roller pairs 1136 and 1137, and an image is formed on a second surface of the sheet S opposite to the first surface.

In the case of simplex printing in which an image is formed on only one surface of the sheet S, or in the case where formation of an image on the second surface of the sheet S has been finished in the duplex printing, the sheet S is guided to a second switching guide 1132 by the first switching guide 1131, and is guided to the second switching guide 1132 to a selected conveyance path. In the case of not performing the processing (post-processing) by the sheet processing apparatus 1150 on the sheet S, the sheet S is guided to a discharge roller pair 1134 by the second switching guide 1132. The discharge roller pair 1134 discharges the sheet S to the outside of the casing 1100B of the printer body 1100A, and stacks the sheet S on a discharge supporting portion 1135 provided on an upper portion of the casing 1100B. In addition, in the case of performing the processing (post-processing) by the sheet processing apparatus 1150 on the sheet S, the sheet S is delivered to the sheet processing apparatus 1150.

Figure 11B:
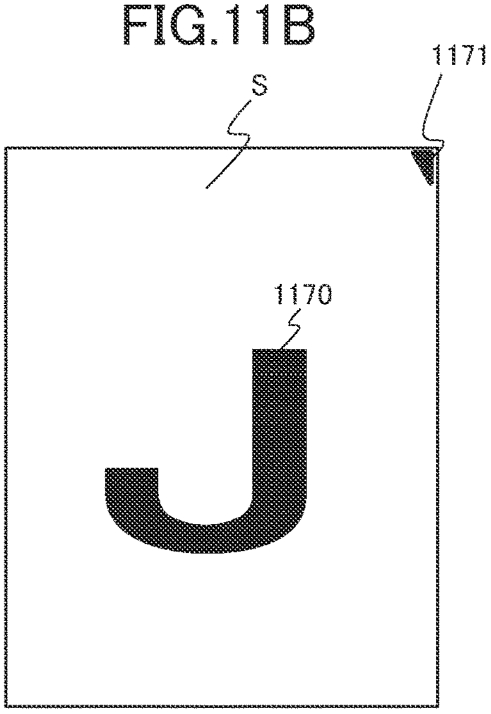
FIGS. 11B and 11C are each a diagram illustrating an example of toner images formed by a printer body according to the second embodiment.
Figure 11C:
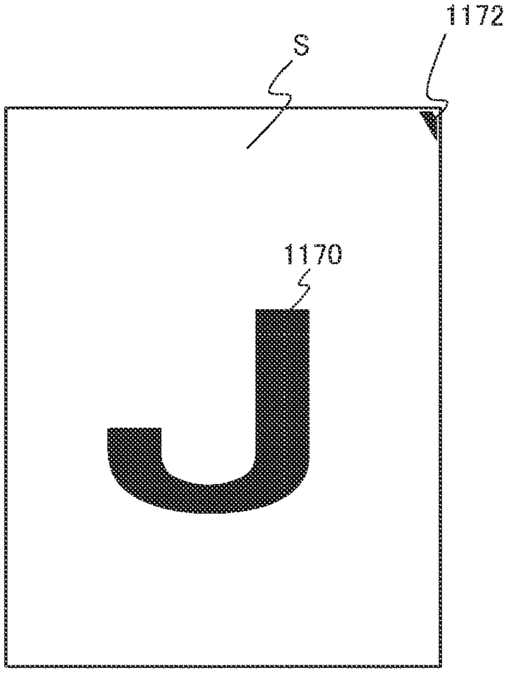

FIGS. 11B and 11C are diagrams illustrating an example of toner images formed on the sheet S. On the illustrated sheet S, a toner image (recording toner image) 1170 for recording an image such as a text, a figure, or a photograph, and toner images (bonding toner image) 1171 and 1172 for bonding sheets together are formed. The bonding toner images 1171 and 1172 are each formed in a bonding region (gluing area) for bonding sheets together. In the sheet processing apparatus 1150 of the present embodiment, corner binding in which a corner portion of the sheet bundle is bonded can be performed, and the bonding region is also set in the corner portion. The positions, shapes, sizes, and the like of the bonding toner images 1171 and 1172 can be changed in accordance with the specifications of the sheet processing apparatus 1150.

To be noted, in the case where the image forming apparatus 1100 makes a booklet by simplex printing, the bonding toner images 1171 and 1172 are each formed on only one surface (the same surface as the recording toner image) of the sheet S. In the case of a booklet formed by duplex printing, the bonding toner images 1171 and 1172 each may be formed on only one surface of the sheet S, or may be formed on both surfaces of the sheet S.

Sheet Processing Apparatus

The sheet processing apparatus 1150 will be described. As illustrated in FIG. 11A, the sheet processing apparatus 1150 is attached to an upper portion of the casing 1100B of the printer body 1100A.

In a processing apparatus body 1150B of the sheet processing apparatus 1150, an inlet roller pair 1151, a heat-and-press bonding portion 1153, and a discharge roller pair 1154 are provided. In addition, the processing apparatus body 1150B includes a stage roller pair 1152, a jogger 1158, an alignment roller 1159, a processing stage 1160, and a discharge tray 1157. The heat-and-press bonding portion 1153 is an example of a sheet bonding apparatus (booklet making apparatus, bonding unit, bonding portion, heat-and-press bonding mechanism, or sticking processing portion) that bonds sheets together.

The inlet roller pair 1151 receives the sheet S discharged from the printer body 1100A and conveys the received sheet S toward the heat-and-press bonding portion 1153. The stage roller pair 1152 conveys the sheet S conveyed from the inlet roller pair 1151 to the processing stage 1160. The processing stage 1160 is an example of a supporting portion (intermediate supporting portion) that supports the sheet bundle to be processed by the heat-and-press bonding portion 1153. In addition, the inlet roller pair 1151 and the stage roller pair 1152 are examples of a conveyance portion that conveys sheets one by one and stacks the sheets on a supporting portion.

The jogger 1158 is a pair of members opposing in the sheet width direction orthogonal to the sheet conveyance direction Vc (sheet discharge direction of the discharge roller pair 1154). The jogger 1158 has a function of supporting part of the sheet bundle supported by the processing stage 1160 (downstream portion of the sheet bundle in the sheet conveyance direction Vc). The alignment roller 1159 moves the sheet S supported by the processing stage 1160 and the jogger 1158 in a direction opposite to the sheet conveyance direction Vc. As a result of this, the sheet S is caused to abut an alignment wall 1160*a* provided at an end portion of the processing stage 1160, and thus the sheet bundle is aligned in the sheet conveyance direction Vc.

The jogger 1158 moves a plurality of sheets aligned by the alignment roller 1159 in the sheet width direction, and conveys the sheets to a predetermined position where the sheets are subjected to the processing by the heat-and-press bonding portion 1153. The predetermined position is a position where the bonding toner images 1171 and 1172 illustrated in FIGS. 11B and 11C are right under a pressurizing plate 1201 of the heat-and-press bonding portion 1153 that will be described later. To be noted, the sheets S are stacked on the processing stage 1160 and aligned in a state in which the discharge roller pair 1154 is separated. The jogger 1158 and the alignment roller 1159 are examples of an alignment portion that aligns the sheet bundle supported on the processing stage 1160. In addition, the sheets are stacked by repeating the operation described above. At this time, a preceding sheet that has been aligned is pressed against the processing stage 1160 by a stamp mechanism 1200 that will be described later with reference to FIG. 12. As a result of this, a situation in which the preceding sheet being dragged by friction with a leading end portion of the succeeding sheet can be suppressed.

The heat-and-press bonding portion 1153 performs heat-and-press bonding of the sheet bundle. In the present embodiment, by repeating an operation in which heat-and-press bonding is performed once each time a preset number (for example, four) of sheets are stacked on the processing stage 1160, a booklet constituted by more sheets (for example, several tens of sheets) can be created as a product. To be noted, in consideration of a situation in which the sheet S is sticking to the heat-and-press bonding portion 1153 after the heat-and-press bonding, the sheet bundle (booklet) can be pressed by the stamp mechanism 1200 that will be described later.

The discharge roller pair 1154 is an example of a discharge portion that discharges the sheet bundle for which the processing by the heat-and-press bonding portion 1153 has been completed. When the processing by the heat-and-press bonding portion 1153 is completed, the discharge roller pair 1154 nips the bundle of sheets S that have been stacked, aligned, and subjected to heat-and-press bonding. The booklet created by the heat-and-press bonding portion 1153 is discharged to the outside of the processing apparatus body 1150B by the discharge roller pair 1154. At the time of discharge, the jogger 1158 retracts from the lower surface of the booklet so as to drop the booklet onto the discharge tray 1157. The timing at which the jogger 1158 retracts from the lower surface of the booklet is set such that the booklet released from the jogger 1158 does not drag a booklet precedingly discharged onto the discharge tray 1157.

The discharge tray 1157 is an example of a discharge supporting portion onto and on which the sheet bundle (booklet) processed by the heat-and-press bonding portion 1153 is discharged and supported. The discharge tray 1157 is supported by the processing apparatus body 1150B so as to be movable in the up-down direction.

Heat-and-Press Bonding Portion and Stamp Mechanism

Figure 12A:
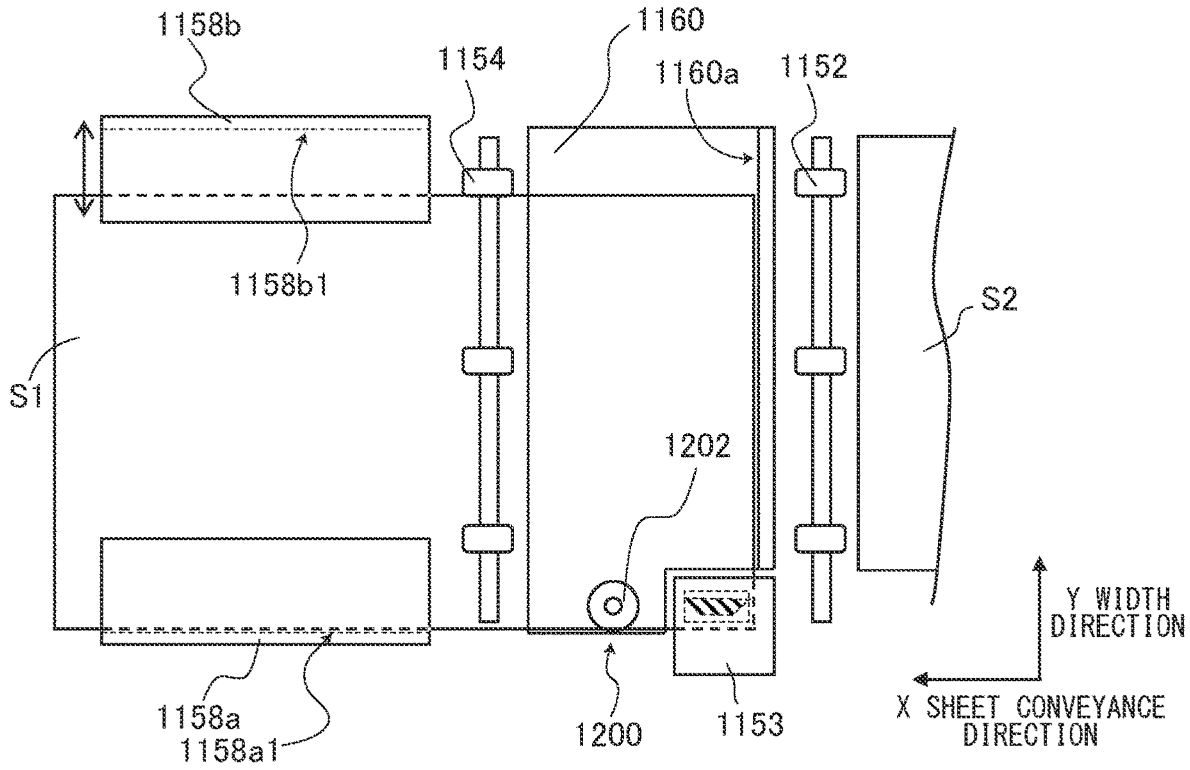
FIGS. 12A and 12B are diagrams for describing an operation of a sheet processing apparatus according to the second embodiment.
Figure 12B:
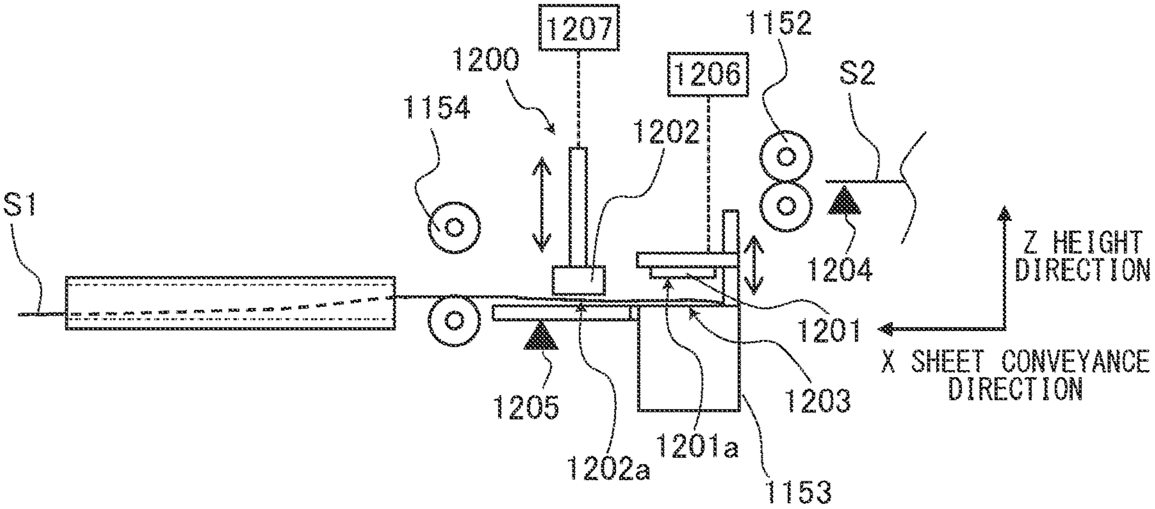

The heat-and-press bonding portion 1153 and the stamp mechanism 1200 of the second embodiment will be described with reference to FIGS. 12A and 12B. FIG. 12A is a diagram illustrating the heat-and-press bonding portion 1153 and the stamp mechanism 1200 as viewed in the direction of an arrow 1156 in FIG. 11 (+Z direction described below). FIG. 12B is a diagram illustrating the heat-and-press bonding portion 1153 and the stamp mechanism 1200 as viewed in the sheet width direction (Y direction described below).

In the description and drawings below, a direction in which a pressurizing plate 1201 of the heat-and-press bonding portion 1153 moves with respect to a receiving portion 1203 to pressurize sheets will be referred to as a Z direction. The Z direction is a height direction (thickness direction) of the sheet bundle subjected to compression bonding by the heat-and-press bonding portion 1153. In addition, directions orthogonal to each other in a virtual plane orthogonal to the Z direction will be referred to as an X direction and a Y direction. In the present embodiment, the X direction is a direction following the sheet conveyance direction, and the Y direction is a direction following the sheet width direction orthogonal to the sheet conveyance direction. If necessary, directions of arrows X, Y, and Z illustrated in each drawing will be respectively expressed as a +X direction, a +Y direction, and a +Z direction, and directions opposite thereto will be respectively expressed as a −X direction, a −Y direction, and a −Z direction.

The heat-and-press bonding portion 1153 includes a pressurizing plate 1201 serving as a pressurizing member (first pressurizing member) and a receiving portion 1203 serving as a receiving member (second pressurizing member). The pressurizing plate 1201 is a part of a heater portion (pressurizing unit) including a heater serving as a heating portion. The pressurizing plate 1201 is configured to be movable in the Z direction with respect to the receiving portion 1203 by the driving force of a motor 1206. The pressurizing plate 1201 reciprocates between a pressurizing position where the pressurizing plate 1201 nips and pressurizes the sheet bundle together with the receiving portion 1203 and a retracted position (standby position) where the pressurizing plate 1201 is retracted from the sheet bundle in the +Z direction. The configuration concerning movement of the heater portion (pressurizing unit) can be basically the same as in the first embodiment.

The heat-and-press bonding portion 1153 moves the pressurizing plate 1201 to the pressurizing position each time a preset number (for example, four) of sheets are stacked on the processing stage 1160, and heats the sheets by the heat of the heater while pressurizing the sheet bundle by the pressurizing plate 1201 and the receiving portion 1203. As a result of this, the sheets can be bonded together via an adhesive (bonding toner). After the heat-and-press bonding, a state in which a sheet can be received in a bonding space on the bonded sheet bundle is taken by returning the pressurizing plate 1201 to the retracted position.

As illustrated in FIGS. 12A and 12B, the stamp mechanism 1200 includes a stamp member 1202 (pressing member) that presses the sheet S1 against the processing stage 1160, and an actuator (drive source) 1207 that drives the stamp member 1202.

The stamp member 1202 is an example of a sheet separation member that separates the sheet from the pressurizing plate 1201. The stamp member 1202 has a sheet contact surface 1202*a* that comes into contact with the upper surface (surface on the +Z side) of the sheet. The stamp member 1202 is capable of reciprocating in the Z direction. The stamp member 1202 moves to a protruding position (pressing position or contact position) where the stamp member 1202 is in contact with the sheet or sheet bundle on the processing stage 1160, and a non-protruding position (separation position or non-contact position) where the stamp member 1202 is separated from the sheet or sheet bundle on the processing stage 1160 in the −Z direction.

When the stamp member 1202 is at the non-protruding position, the sheet contact surface 1202*a* of the stamp member 1202 is positioned at the same position or more on the +Z side (side farther from the receiving portion 1203) than a sheet contact surface 1201*a* of the pressurizing plate 1201 at the retracted position in the Z direction. When the stamp member 1202 is at the protruding position, the sheet contact surface 1202*a* of the stamp member 1202 protrudes to a position that is more on the −Z side (side closer to the receiving portion 1203) than the sheet contact surface 1201*a* of the pressurizing plate 1201 at the retracted position.

The actuator 1207 is an example of a second drive source that is controlled independently from a motor 1206 (first drive source) for moving the pressurizing plate 1201 in the pressurizing direction. The actuator 1207 drives the stamp member 1202 to move to the protruding position and the non-protruding position. In the present embodiment, a solenoid unit is used as the actuator 1207. This solenoid unit holds the stamp member 1202 at the protruding position in the case of an ON state (energized state). In the case where the solenoid unit is in an OFF state (non-energized state), the stamp member 1202 is held at the non-protruding position. The actuator 1207 (second drive source) is not limited to a solenoid unit, and may be, for example, a motor that reciprocates the stamp member 1202 via a cam mechanism.

In the present embodiment, there are two situations where the stamp mechanism 1200 presses the sheet S. The first is when a succeeding sheet is stacked on a preceding sheet on the processing stage 1160. A controller 1190 of the sheet processing apparatus 1150 illustrated in FIG. 11A controls the actuator 1207 so as to press the sheet bundle by the stamp member 1202 in the case where a succeeding sheet is conveyed to the processing stage 1160 by the stage roller pair 1152. As a result of the stamp member 1202 being moved to the protruding position while the succeeding sheet is being stacked, a situation in which the trailing end of the preceding sheet is moved away from the alignment wall 1160*a* by the friction between the succeeding sheet and the preceding sheet and thus the alignment of the sheets is disturbed can be suppressed.

The second is while the heat-and-press bonding operation is executed. In the process of the pressurizing plate 1201 returning from the pressurizing position to the retracted position during the heat-and-press bonding operation, the stamp member 1202 is moved to the protruding position. The controller 1190 of the sheet processing apparatus 1150 illustrated in FIG. 11A controls the motor 1206 and the actuator 1207 such that the stamp member 1202 relatively moves with respect to the pressurizing plate 1201 in the process of moving the pressurizing plate 1201 from the pressurizing position to the retracted position. As a result of this, the possibility of a sheet sticking to the stamp member 1202 after the heat-and-press bonding can be lowered. The control example of the present embodiment will be described below with reference to FIG. 13.

As illustrated in FIG. 12A, the jogger 1158 includes a pair of alignment plates 1158*a* and 1158*b* opposing each other in the sheet width direction (Y direction). At the time of alignment of the sheets, an alignment plate 1159*a* moves a plurality of sheet aligned by the alignment roller 1159 toward the alignment plate 1158*a* in a state in which the alignment plate 1158*a* is standing by at a predetermined position. The predetermined position is a position corresponding to the position of the sheet during heat-and-press bonding. Alignment walls 1158*a*1 and 1158*b*1 of the alignment plates 1158*a* and 1158*b* align each sheet in the sheet width direction.

To be noted, the position where the stamp member 1202 comes into contact with the sheet is set more on the outside in the sheet width direction (Y direction) than a passage region of the sheet S2 conveyed to the processing stage 1160 by the stage roller pair 1152. Therefore, the succeeding sheet S2 does not collide with the stamp member 1202 when the sheet S2 is conveyed to the processing stage 1160 in a state in which the stamp member 1202 is pressing the sheet S1.

As illustrated in FIG. 12B, a sheet presence sensor 1204 is disposed upstream of the stage roller pair 1152 in the sheet conveyance direction. The signal of the sheet presence sensor 1204 is HI while the sheet is passing, and is LOW while the sheet is not passing.

In addition, a processing stage sensor 1205 that detects presence or absence of a sheet on the stage is disposed on the processing stage 1160. The signal of the processing stage sensor 1205 is HI when a sheet is present on the processing stage 1160, and the signal of the processing stage sensor 1205 is LOW when no sheet is present on the processing stage 1160.

Figure 13:
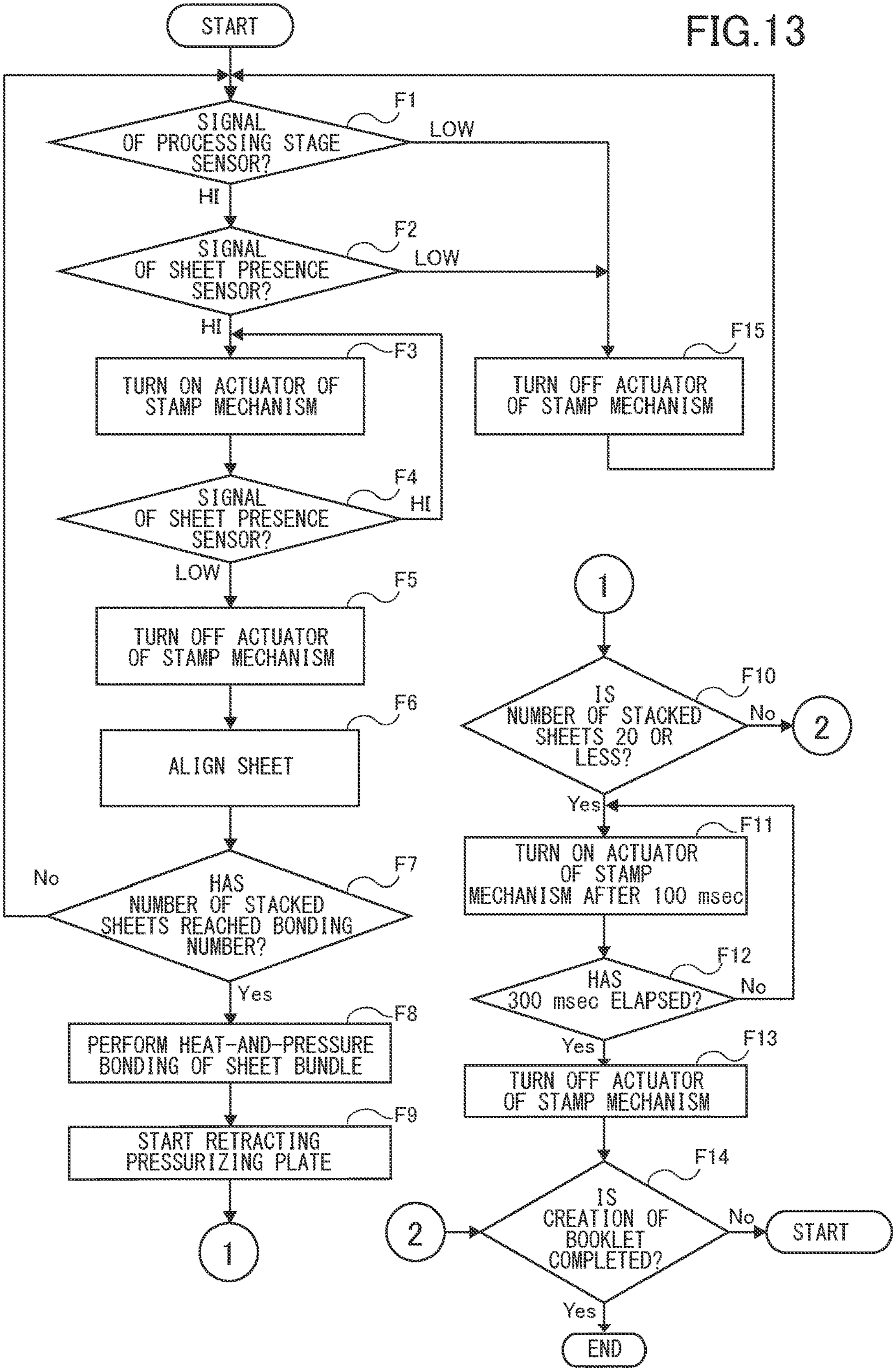
FIG. 13 is a flowchart illustrating a control example of the sheet processing apparatus according to the second embodiment.

FIG. 13 is a flowchart illustrating a control example of the stamp mechanism 1200 and the heat-and-press bonding portion 1153. This flowchart is executed by the controller 1190 of the sheet processing apparatus 1150 illustrated in FIG. 11A in the case where a booklet making job is input to the image forming apparatus 1100. The controller 1190 includes a storage device that stores a program following this flowchart, and a CPU that executes the program. In the description below, each step of the flowchart is executed by the CPU of the controller unless otherwise described.

In F1, the signal of the processing stage sensor 1205 is determined. In the case where the signal of the processing stage sensor 1205 is HI indicating that a sheet is present, the process proceeds to F2. In the case where the signal of the processing stage sensor 1205 is LOW indicating that no sheet is present, the process proceeds to F15.

In F2, the signal of the sheet presence sensor 1204 is determined. In the case where the signal of the sheet presence sensor 1204 is HI indicating that a sheet is present, the process proceeds to F3. In the case where the signal of the sheet presence sensor 1204 is LOW indicating that no sheet is present, the process proceeds to F15.

In the case where it has been determined that no sheet is present in F1 or F2, the actuator 1207 of the stamp mechanism 1200 is turned off and the stamp member 1202 is moved to the standby position in F15, and then the process returns to F1.

In F3, the actuator 1207 of the stamp mechanism 1200 is turned on, and thus the stamp member 1202 is moved to the protruding position. As a result of this, while the sheet is conveyed onto the processing stage 1160 by the stage roller pair 1152, the sheet on the processing stage 1160 is pressed by the stamp member 1202.

In F4, the signal of the sheet presence sensor 1204 is determined. In the case where the signal of the sheet presence sensor 1204 is HI indicating that a sheet is present, the process proceeds to F3. In the case where the signal of the sheet presence sensor 1204 is LOW indicating that no sheet is present, the process proceeds to F5.

In F5, the actuator 1207 of the stamp mechanism 1200 is turned off, and thus the stamp member 1202 is moved to the standby position. As a result of this, after the sheet is conveyed onto the processing stage 1160 by the stage roller pair 1152, the stamp member 1202 is separated from sheet.

In F6, a process of aligning the sheet in the X direction and the Y direction by using the jogger 1158 and the alignment roller 1159 is performed.

In F7, the number of sheets stacked on the processing stage 1160 is determined. In the case where the number of sheets stacked on the processing stage 1160 has not reached a bonding number, the process returns to F1. The process proceeds to F8 when the number of sheets stacked on the processing stage 1160 reaches the bonding number. The "bonding number" is the number of sheets on which the heat-and-press bonding should be performed by the heat-and-press bonding portion 1153. The bonding number corresponds to the predetermined number of sheets of each batch or the last sheet in the booklet making job. In the case of the second embodiment, heat-and-press bonding is performed once each time the number of sheets stacked on the processing stage 1160 increases by four. In this case, the bonding number increases like 4, 8, 12 . . . . In addition, the heat-and-press bonding is performed also in the case where the last sheet constituting one copy of booklet is stacked on the processing stage 1160. For example, in the case of making one copy of booklet by bonding seven sheets together, the bonding number is "4" and "7". That is, the first heat-and-press bonding is executed when the fourth sheet is stacked on the processing stage 1160, and the second heat-and-press bonding is executed when the seventh sheet is stacked on the processing stage 1160.

In F8, heat-and-press bonding is performed by the heat-and-press bonding portion 1153. That is, the stamp member 1202 is moved in the pressurizing direction (−Z direction) to pressurize the sheet bundle, and the sheet bundle is heated by the heat of the heater.

In F9, a signal to start moving the pressurizing plate 1201 in the retracting direction (+Z direction) is issued. As a result of this, the stamp member 1202 starts moving from the pressurizing position to the retracted position.

In F10, whether or not the number of sheets stacked on the processing stage 1160 is 20 or less is determined. The process proceeds to F14 in the case where the number of stacked sheets is larger than 20, and proceeds to F11 in the case where the number of stacked sheets is 20 or less. In the case where the number of stacked sheets is larger than 20 in the second embodiment, the sheet bundle easily peels off from the pressurizing plate 1201 by its own weight when returning the pressurizing plate 1201 to the retracted position after the heat-and-press bonding. Therefore, in the case where the number of stacked sheets is larger than 20, it is determined that the necessity to separate the sheet bundle from the pressurizing plate 1201 by the stamp mechanism 1200 when retracting the pressurizing plate 1201 is low, and the process of F11 to F13 is not executed. In the case where the number of stacked sheets is 20 or less, it is determined that the sheet bundle needs to be separated from the pressurizing plate 1201 by the stamp mechanism 1200 when retracting the pressurizing plate 1201, and the process of F11 to F13 is executed.

In F11, the actuator 1207 of the stamp mechanism 1200 is turned on after waiting for 100 msec since the start of movement of the pressurizing plate 1201 in F9, and thus the stamp member 1202 is moved to the protruding position. As a result of this, the stamp member 1202 protrudes more in the pressurizing direction (−Z direction) than the pressurizing plate 1201 in the process of moving the pressurizing plate 1201 from the pressurizing position to the retracted position, and the sheet contact surface 1202*a* comes into contact with the sheet bundle. Then, the sheet bundle having undergone heat-and-press bonding is separated from the pressurizing plate 1201.

In F12, whether or not 300 msec has elapsed since the actuator 1207 of the stamp mechanism 1200 has been turned on is determined. The process proceeds to F13 in the case where 300 msec has elapsed, and returns to F11 in the case where 300 msec has not elapsed.

In F13, the actuator 1207 of the stamp mechanism 1200 is turned off, and thus the stamp member 1202 is moved from the protruding position to the non-protruding position.

In F14, whether or not creation of the booklet has been completed, that is, whether or not heat-and-press bonding has been completed for all the sheets constituting one copy of booklet is determined. In other words, in F14, whether or not the previous heat-and-press bonding (F8) is the final heat-and-press bonding (final bonding) in the booklet making job is determined. The process returns to the start in the case where the creation of the booklet is not completed (there is a sheet yet to be bonded), and the process is ended in the case where the creation of the booklet is completed.

In the case of the present embodiment, the time required for the pressurizing plate 1201 to return from the pressurizing position to the retracted position is 500 msec in the case where the number of stacked sheets is 20. In the case where the number of stacked sheets is smaller than 20, the required time described above is longer than 500 msec, and in the case where the number of stacked sheets is larger than 20, the required time described above is shorter than 500 msec. Therefore, if the stamp mechanism 1200 is operated in accordance with the time settings of F11 to F13 described above, the stamp member 1202 protrudes with respect to the pressurizing plate 1201 while the pressurizing plate 1201 returns from the pressurizing position to the retracted position. In addition, the stamp member 1202 returns to the non-protruding position before the pressurizing plate 1201 reaches the retracted position.

As a result of the stamp member 1202 returning to the non-protruding position, the maximum stacking height (receiving opening in the heat-and-press bonding portion 1153) of the sheet bundle that can be received into the bonding space between the pressurizing plate 1201 and the receiving portion 1203 is not reduced by the stamp member 1202. Therefore, sticking of the sheets to the pressurizing plate 1201 can be suppressed while avoiding increase in the size of the apparatus or the like.

As described above, according to the present embodiment, a sheet bonding apparatus (booklet making apparatus) and an image forming apparatus that are capable of making sticking of the sheets less likely to occur can be provided.

Other Modification Examples

In the first and second embodiments, a configuration in which the sheet separation member moves, in the process of the pressurizing member moving from the pressurizing position to the retracted position, such that the distance between the first contact surface of the pressurizing member and the second contact surface of the sheet separation member in the pressurizing direction increases has been described as an example. The configuration is not limited to this, and for example, the sheet separation member may be a member fixed to the frame body of the sheet bonding apparatus (booklet making apparatus). In this case, the sheet bundle can be separated from the pressurizing member in the process of the pressurizing member moving from the pressurizing position to the retracted position, by positioning the sheet separation member such that the second contact surface of the sheet separation member protrudes more in the pressurizing direction (−Z direction) than the first contact surface of the pressurizing member at the retracted position. To be noted, as described in the first and second embodiments, moving the sheet separation member with respect to the pressurizing member has a merit such as the fact that the receiving opening of the sheet bonding apparatus (booklet making apparatus) can be made wider.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-044785, filed on Mar. 20, 2023, which is hereby incorporated by reference herein in its entirety.

As described above, according to the present disclosure, a sheet bonding apparatus (booklet making apparatus) and an image forming apparatus that are capable of making sticking of the sheets less likely to occur can be provided.

What is claimed is:

1. A booklet making apparatus comprising:

a pressurizing member configured to oppose a first surface of a sheet bundle in which a plurality of sheets including at least one sheet on which an adhesive layer is formed are stacked;

a receiving member configured to oppose a second surface of the sheet bundle opposite to the first surface and nip the sheet bundle together with the pressurizing member;

a moving portion configured to move the pressurizing member to a retracted position where the pressurizing member is retracted from the sheet bundle and a pressurizing position where the pressurizing member is in contact with the sheet bundle to pressurize the sheet bundle;

a heating portion configured to heat the pressurizing member; and a sheet separation member configured to come into contact with the first surface of the sheet bundle and separate the sheet bundle from the pressurizing member in a process of the pressurizing member moving from the pressurizing position to the retracted position, wherein the pressurizing member has a first contact surface configured to come into contact with the first surface of the sheet bundle, wherein the sheet separation member has a second contact surface configured to come into contact with the first surface of the sheet bundle, wherein the sheet separation member is relatively movable to a first position and a second position with respect to the pressurizing member, the first position being a position where the second contact surface is at the same position as the first contact surface or is farther from the receiving member than the first contact surface is in a pressurizing direction in which the sheet bundle is pressed by the pressurizing member, the second position being a position where the second contact surface is closer to the receiving member than the first contact surface is in the pressurizing direction, wherein the sheet separation member is positioned at the first position in a case where the pressurizing member is positioned at the retracted position, and wherein the sheet separation member is configured to move from the first position to the second position in the process of the pressurizing member moving from the pressurizing position to the retracted position.

2. The booklet making apparatus according to claim 1, wherein in the process of the pressurizing member moving from the pressurizing position to the retracted position, the sheet separation member is configured to move from the second position to the first position after moving from the first position to the second position and before the pressurizing member reaches the retracted position.

3. The booklet making apparatus according to claim 2, further comprising:

a sheet abutting portion that an end portion of a sheet abuts; and an alignment member configured to align the sheet by causing the end portion of the sheet to abut the sheet abutting portion through a space between the pressurizing member and the receiving member.

4. The booklet making apparatus according to claim 3, wherein the second contact surface is inclined in the pressurizing direction toward a downstream side in a direction in which the alignment member moves the sheet toward the sheet abutting portion.

5. The booklet making apparatus according to claim 1, wherein the sheet separation member is configured to be held at the first position in a case where the pressurizing member moves from the retracted position to the pressurizing position.

6. The booklet making apparatus according to claim 1, wherein the sheet separation member is configured to move from the first position to the second position in a case where the pressurizing member moves from the pressurizing position to the retracted position after pressurizing the sheet bundle of a first thickness, and wherein the sheet separation member is configured not to move from the first position to the second position in a case where the pressurizing member moves from the pressurizing position to the retracted position after pressurizing the sheet bundle of a second thickness larger than the first thickness.

7. The booklet making apparatus according to claim 1, wherein a maximum value of a distance between the first contact surface and the second contact surface in the pressurizing direction in a case where the pressurizing member moves from the pressurizing position to the retracted position is larger than a maximum value of the distance between the first contact surface and the second contact surface in the pressurizing direction in a case where the pressurizing member moves from the retracted position to the pressurizing position.

8. The booklet making apparatus according to claim 1, wherein the booklet making apparatus is configured to bond the plurality of sheets in the sheet bundle to each other by pressurizing the sheet bundle by the pressurizing member in a state in which the sheet bundle has the adhesive layer on the first surface, and then bond a succeeding sheet stacked on the sheet bundle to the sheet bundle by pressurizing the succeeding sheet by the pressurizing member.

9. The booklet making apparatus according to claim 1, further comprising:

a first drive source configured to drive the moving portion;

a second drive source configured to drive the sheet separation member; and a controller configured to control the first drive source and the second drive source such that the sheet separation member relatively moves with respect to the pressurizing member in the process of the pressurizing member moving from the pressurizing position to the retracted position.

10. The booklet making apparatus according to claim 9, further comprising:

a supporting portion configured to support a sheet thereon; and a conveyance portion configured to convey a sheet to the supporting portion, wherein the controller is configured to control the second drive source to press the sheet bundle by the sheet separation member in a case where a sheet is conveyed by the conveyance portion onto the sheet bundle supported on the supporting portion.

11. The booklet making apparatus according to claim 1, wherein the heating portion is a heater that is configured to generate heat in response to power supply thereto, and wherein the heater is in contact with a surface of the pressurizing member on a side opposite to a surface of the pressurizing member configured to come into contact with the sheet bundle.

12. An image forming apparatus comprising:

an image forming apparatus body configured to form images on sheets and apply an adhesive on the sheets while conveying the sheets one by one; and the booklet making apparatus according to claim 1 configured to make a booklet by stacking and bonding a plurality of sheets together by using the adhesive, the plurality of sheets being received from the image forming apparatus body.

13. A booklet making apparatus comprising:

a pressurizing member configured to oppose a first surface of a sheet bundle in which a plurality of sheets including at least one sheet on which an adhesive layer is formed are stacked;

a receiving member configured to oppose a second surface of the sheet bundle opposite to the first surface and nip the sheet bundle together with the pressurizing member;

a moving portion configured to move the pressurizing member to a retracted position where the pressurizing member is retracted from the sheet bundle and a pressurizing position where the pressurizing member is in contact with the sheet bundle to pressurize the sheet bundle;

a heating portion configured to heat the pressurizing member;

a sheet separation member configured to come into contact with the first surface of the sheet bundle and separate the sheet bundle from the pressurizing member in a process of the pressurizing member moving from the pressurizing position to the retracted position; and a movement mechanism coupled to the pressurizing member and the sheet separation member and configured to relatively move the sheet separation member with respect to the pressurizing member in an interlocked manner with movement of the pressurizing member from the pressurizing position to the retracted position.

14. The booklet making apparatus according to claim 13, wherein the movement mechanism includes:

a coupling portion configured to couple the sheet separation member to the pressurizing member so as to allow relative movement of the sheet separation member and the pressurizing member in a pressurizing direction in which the sheet bundle is pressed by the pressurizing member, an urging member configured to urge the sheet separation member in a direction opposite to the pressurizing direction, and an abutting member supported by a frame body of the booklet making apparatus and configured to abut the coupling portion or the sheet separation member to move the sheet separation member in the pressurizing direction with respect to the pressurizing member while the pressurizing member moves from the pressurizing position to the retracted position.

15. The booklet making apparatus according to claim 14, wherein the coupling portion includes (i) a first shaft portion configured to move together with the pressurizing member and (ii) a first lever configured to rotate about the first shaft portion and engaged with the sheet separation member, and wherein the abutting member is a second lever configured to rotate about a second shaft that is positioned with respect to the frame body of the booklet making apparatus.

16. The booklet making apparatus according to claim 15, wherein the urging member is a spring configured to urge the first lever in a first rotational direction about the first shaft portion, wherein the sheet separation member is configured to move in the pressurizing direction with respect to the pressurizing member in a case where the first lever rotates in a second rotational direction opposite to the first rotational direction, and wherein in the process of the pressurizing member moving from the pressurizing position to the retracted position, the second lever is configured to abut the first lever and rotate the first lever in the second rotational direction.

* * * * *